US012722972B2

(12) United States Patent
Wallace et al.

(10) Patent No.: US 12,722,972 B2
(45) Date of Patent: Sep. 1, 2026

(54) HYBRID PARTIAL OXIDATION AND REVERSE WATER GAS SHIFT BASED CARBON MONOXIDE PRODUCTION SYSTEM

(71) Applicant: Dioxycle, Saint Ouen sur Seine (FR)

(72) Inventors: Paul S Wallace, Austin, TX (US); Raphaël Sanjuan, St Maur des Fossés (FR); Jonathan Maistrello, La Garenne Colombes (FR); Sarah Lamaison, Paris (FR)

(73) Assignee: Dioxycle, Saint Ouen sur Seine (FR)

( * ) Notice: Subject to any disclaimer, the term of this patent is extended or adjusted under 35 U.S.C. 154(b) by 0 days.

(21) Appl. No.: 19/278,455

(22) Filed: Jul. 23, 2025

(65) Prior Publication Data

US 2026/0028225 A1 Jan. 29, 2026

Related U.S. Application Data

(60) Provisional application No. 63/686,880, filed on Aug. 26, 2024, provisional application No. 63/675,252, filed on Jul. 24, 2024.

(51) Int. Cl.
*C01B 3/382* (2026.01)

(52) U.S. Cl.
CPC ...... *C01B 3/382* (2013.01); *C01B 2203/0255* (2013.01); *C01B 2203/0283* (2013.01); *C01B 2203/0833* (2013.01); *C01B 2203/1241* (2013.01)

(58) Field of Classification Search
CPC ............ C01B 3/382; C01B 2203/0255; C01B 2203/0283; C01B 2203/0833; C01B 2203/1241
See application file for complete search history.

(56) References Cited

U.S. PATENT DOCUMENTS

| | | | |
|---|---|---|---|
| 3,694,186 A | 9/1972 | Llewelyn | |
| 3,983,010 A | 9/1976 | Rauch et al. | |
| 4,019,879 A | 4/1977 | Rabo et al. | |
| 4,155,985 A | 5/1979 | Doerges | |
| 5,628,911 A | 5/1997 | Kowallik et al. | |
| 6,939,941 B2 | 9/2005 | Gilmore et al. | |
| 7,537,742 B2 | 5/2009 | Baksh et al. | |
| 8,623,303 B2 | 1/2014 | Pedersen et al. | |
| 9,067,847 B2 | 6/2015 | Bashir et al. | |
| 2022/0081289 A1* | 3/2022 | De Sarkar | C01B 3/12 |
| 2023/0174376 A1 | 6/2023 | Rytter et al. | |

FOREIGN PATENT DOCUMENTS

| | | |
|---|---|---|
| AU | 2022286649 A1 | 11/2023 |
| DE | 102007029435 A1 | 1/2009 |
| EP | 1492725 B1 | 11/2016 |
| EP | 3165504 A1 | 5/2017 |
| EP | 4371933 A1 | 5/2024 |

OTHER PUBLICATIONS 3M. (2021). A high level of consistency and control: 3M™ Liqui-Cel™ Membrane Contactors [Brochure]. 3M. https://multimedia.3m.com/mws/media/2091084O/3m-spsd-liqui-cel-general-brochure.pdf.

C. Botero et. al. (2013). Coal-$CO_2$ slurry feed for pressurized gasifiers: Slurry preparation system characterization and economics. Energy Procedia, 37, 6646-6655. https://doi.org/10.1016/j.egypro.2013.06.598.

H. Inouye et al. (1978). Formation of iron carbonyl between a ½□%□Mo steel and high-pressure gases containing carbon monoxide (Report No. □05000553). U.S. Department of Energy. https://doi.org/10.2172/5000553.

Smith, J., & Doe, A. (2008). Investigation of the effect of $H_2S$ on the performance of an iron/chromium-based high-temperature water-gas shift catalyst. International Journal of Hydrogen Energy, 33(5), 123-134. https://doi.org/10.1016/j.ijhydene.2008.05.123.

W. L. Gore & Associates, Inc. (2024). GORE® Tubular Back-Pulse Filters for lithium applications: Efficient metal hydroxides filtration at high flow rates (Brochure No. □ILF-006-BRC-EN-JAN24). W.□L.□Gore□&□Associates.

International Search Report and Written Opinion dated Oct. 29, 2025 from International Application No. PCT/IB2025/057478, 12 pages.

F. Bustamante et al. (2003). Kinetics of the Homogeneous Reverse Water-Gas Shift Reaction at High Temperature. [Technical report]. Drive on Wood. https://www.driveonwood.com/static/media/uploads/pdf/reverse_water_gas_shift_reaction.pdf.

Linde Engineering. (2018). Hydrogen Recovery by Pressure Swing Adsorption. Available at: https://assets.linde.com/-/media/global/engineering/engineering/home/products-and-services/process-plants/adsorption-and-membrane-plants/hydrogen-recovery-and-purification/ha_h_1_1_e_09_150dpi_nb.pdf.

Linde Engineering. (2018). Hydrogen. H2/1/1/E/12. Available at: https://assets.linde.com/-/media/global/engineering/engineering/home/products-and-services/process-plants/h2_1_1_e_12_150dpi_nb.pdf.

Diffusion Alloys. (2024). Metal dusting: Impacts, Causes and Prevention. https://diffusion-alloys.com/wp-content/uploads/2024/03/metal-dusting-impacts-causes-and-prevention_0.pdf.

* cited by examiner

*Primary Examiner* — Stuart L Hendrickson
(74) *Attorney, Agent, or Firm* — Daylight Law, P.C.

(57) ABSTRACT

This disclosure relates to systems and methods for conversion of carbon dioxide to carbon monoxide. A disclosed method includes supplying reactants including carbon dioxide, hydrogen, and methane to a catalytic reactor, and converting the carbon dioxide and methane to carbon monoxide. The disclosed method also includes supplying oxygen and methane to a partial oxidation reactor, supplying additional carbon dioxide to the partial oxidation reactor for conversion to carbon monoxide, and transporting an output stream of the partial oxidation reactor to an outer chamber of the catalytic reactor to facilitate catalytic reactions therein.

13 Claims, 10 Drawing Sheets

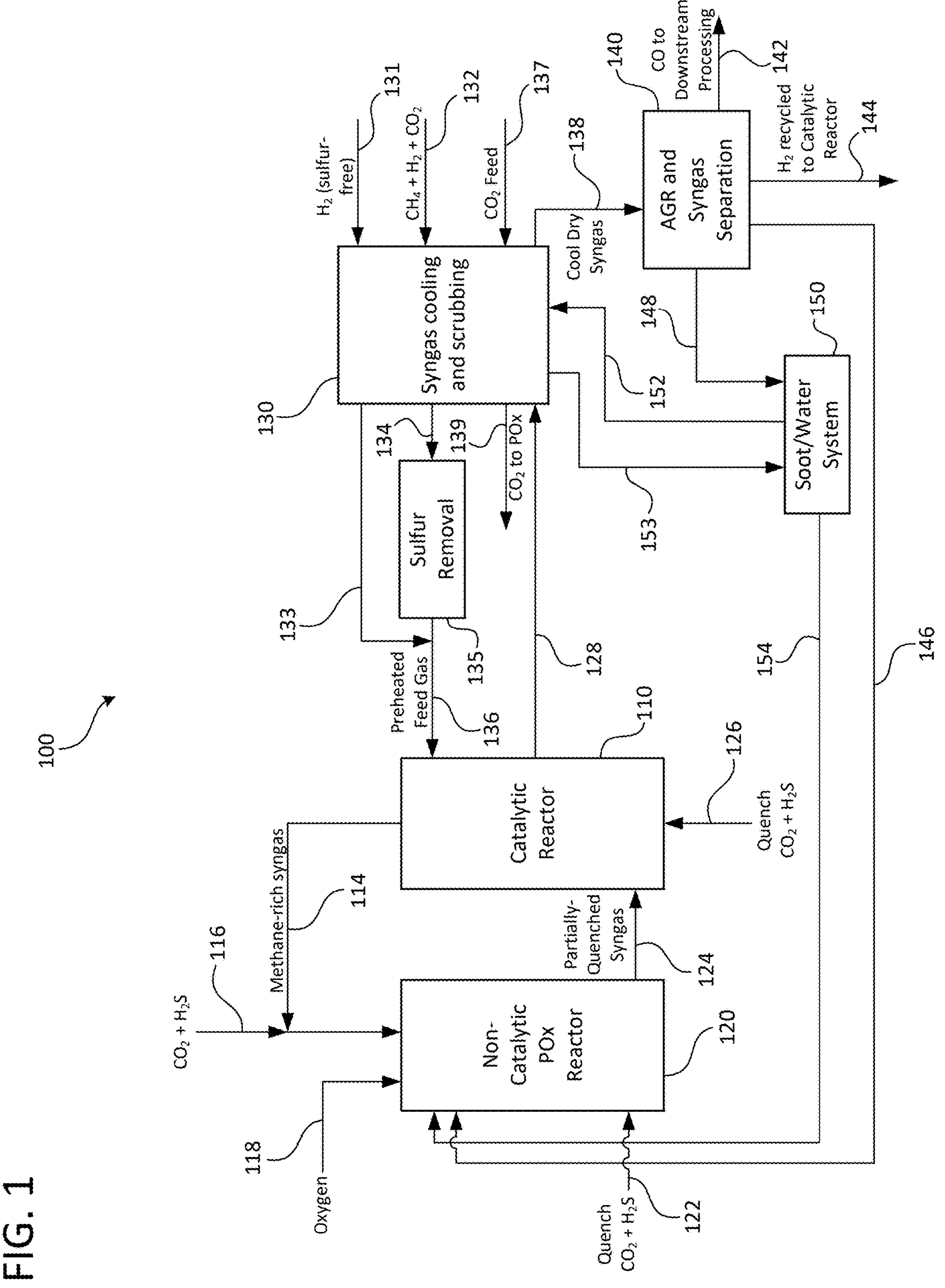
FIG. 1
100
Non-Catalytic POx Reactor
120
Catalytic Reactor
110
Syngas cooling and scrubbing
130
Sulfur Removal
AGR and Syngas Separation
140
Soot/Water System
150
$CO_2 + H_2S$
116
Methane-rich syngas
114
Oxygen
118
Quench $CO_2 + H_2S$
122
Partially-Quenched Syngas
124
Quench $CO_2 + H_2S$
126
128
Preheated Feed Gas
136
133
135
134
139
$CO_2$ to POx
$H_2$ (sulfur-free)
131
$CH_4 + H_2 + CO_2$
132
$CO_2$ Feed
137
Cool Dry Syngas
138
CO to Downstream Processing
142
$H_2$ recycled to Catalytic Reactor
144
146
148
152
153
154

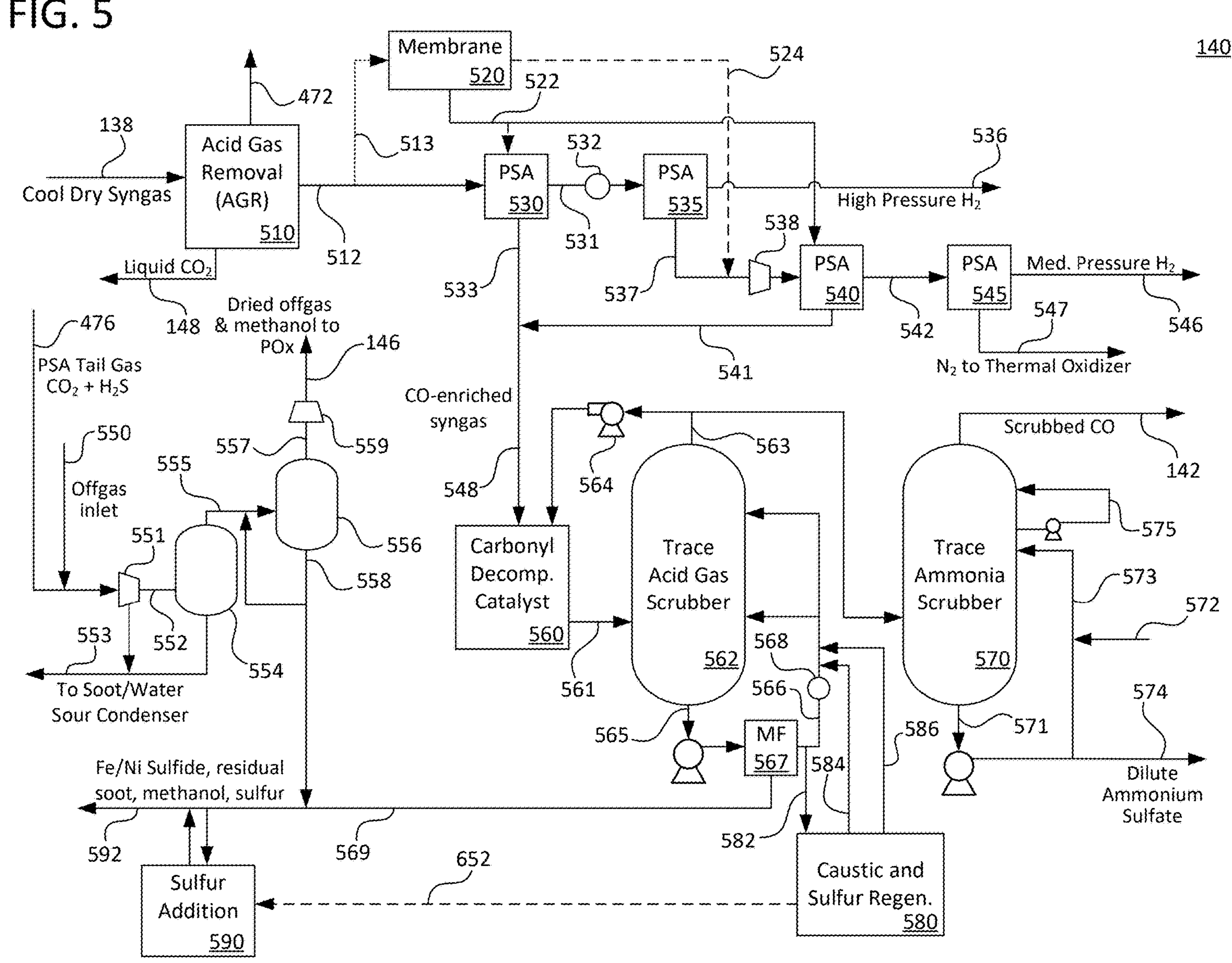
FIG. 5
140
Cool Dry Syngas
138
Acid Gas Removal (AGR) 510
472
Liquid $CO_2$
148
512
513
Membrane 520
522
524
PSA 530
531
532
533
PSA 535
537
538
PSA 540
541
542
PSA 545
547
$N_2$ to Thermal Oxidizer
Med. Pressure $H_2$
546
High Pressure $H_2$
536
CO-enriched syngas
548
Carbonyl Decomp. Catalyst 560
561
Trace Acid Gas Scrubber 562
563
564
565
566
MF 567
568
569
Trace Ammonia Scrubber 570
571
572
573
574
575
Scrubbed CO
142
Dilute Ammonium Sulfate
Caustic and Sulfur Regen. 580
582
584
586
652
Sulfur Addition 590
592
Fe/Ni Sulfide, residual soot, methanol, sulfur
PSA Tail Gas $CO_2$ + $H_2S$
476
Offgas inlet
550
551
552
553
554
555
556
557
558
559
To Soot/Water Sour Condenser
Dried offgas & methanol to POx
146

580 to MF 567 flush
652
SWRO 650
658
Formic Acid Recovery 655
546
MP $H_2$
641
Offgas to 550
Degas 640
645
633
Polysulfide, $Na_2CO_3$
586
584
EDBM 630
637
631
632
635
654
Static Mixer 665
Homogenizer 662
$H_2S + CO_2$
667
621
546
MP $H_2$
623
Degas 620
Offgas to 550
Sulfur Addition 660
582
from MF 567
612
614
MF 610
656

150

800
150
739
812
MF
810
MP $H_2$
546
813
Degas
820
822
824
SWRO
830
832
831
833
882
883
881
EDBM
880
884
885
886
SWRO
840
842
841
574
845
BWRO
850
852
851
SWRO
855
857
874
Recycle
$NH_4CN$
$NH_4HCO_3$
$NH_4HS$
MP $H_2$
546
Degas
860
861
862
Offgas
to 550
EDI
870
872
High-
purity
water
MP $H_2$
546
Degas
887
888
Offgas
to 550
889
Tank
890
891
Vacuum
Column
895
896
897
898

HYBRID PARTIAL OXIDATION AND REVERSE WATER GAS SHIFT BASED CARBON MONOXIDE PRODUCTION SYSTEM

CROSS REFERENCE TO RELATED APPLICATIONS

This application claims the benefit of U.S. Provisional Patent Application No. 63/675,252 as filed on Jul. 24, 2024, and U.S. Provisional Patent Application No. 63/686,880 as filed on Aug. 26, 2024, all of which are both incorporated by reference herein in their entireties for all purposes.

BACKGROUND

There is an urgent need to develop technologies that make the capture or valorization of carbon dioxide ($CO_2$) more economical in highly emitting sectors of the economy. Furthermore, there is an urgent need to reduce emissions related to the production of useful fuels and chemicals in our society and to find alternative ways to produce such fuels sustainably instead of relying on fossil resource extraction and processing for their production. Accordingly, technologies that both generate useful fuels and chemicals while simultaneously utilizing $CO_2$ feedstocks that would otherwise have been emitted into the atmosphere are critically important. These technologies not only reduce net emissions but also create economic value by offsetting the costs of oxocarbon capture and conversion through the production of valuable chemicals. Conversion of hydrocarbons and other fuels into useful chemicals without generating additional $CO_2$ would also be beneficial.

One economically useful oxocarbon is carbon monoxide (CO), which can be valorized directly in an oxocarbon electrolyzer into olefins, alcohols, and carboxylates, but can also be used in Fischer-Tropsch synthesis and other methods to create a variety of other useful industrial chemicals. CO can be generated from $CO_2$ using the reverse water gas shift (RWGS) reaction, but because this reaction is quite endothermic, high temperatures are required to have a reasonable conversion rate; traditional methods can be inefficient at best and may create additional $CO_2$ during the process. Newer gas heated reformer (GHR) reactors or catalytic partial oxidation (CPOx) reactors can conduct the RWGS reaction relatively efficiently but require nearly sulfur-free feedstock (using natural gas and/or $CO_2$) to avoid poisoning nickel-based or other catalysts which are used in the reactors. Furthermore, these state-of-the-art reactors are generally used to produce low-CO content syngas with elevated hydrogen levels. This is because in most applications of these reactors, hydrogen gas is the desired output. The low-CO content syngas is often insufficient as a feedstock for sustainably producing chemicals and fuels through the valorization of CO.

SUMMARY

This disclosure relates to systems and methods for conversion of $CO_2$ and hydrocarbons into CO. In specific embodiments, the systems include two coupled reactors. Systems as described provide a cost-effective platform to convert captured $CO_2$ along with hydrogen as well as light hydrocarbons such as natural gas or biogas into a high-purity CO product stream that can be directly fed into a CO electrolyzer or other synthetic pathways. Specific embodiments utilize dual reactors, where heat from a higher temperature non-catalytic POx reactor is used to drive catalyzed reactions in a lower temperature upstream reactor. In specific embodiments, the dual reactors can be RWGS reactors. In the catalytic reactor, hydrogen and incoming hydrocarbons such as methane react with a volume of $CO_2$, where a catalyst can promote RWGS, steam methane reforming (SMR), and/or dry methane reforming (DMR) reactions. The output of the catalytic reactor along with a second volume of $CO_2$ can be fed into a POx reactor, where heated oxygen is added so that residual methane can undergo partial oxidation. Heat from this exothermic reaction brings the POx reactor to a high temperature where the RWGS reaction is thermodynamically favorable. The partial oxidation of methane creates some CO product but also creates more hydrogen that net drives the equilibrium of the RWGS reaction toward a higher conversion of $CO_2$ to CO. The converted syngas can be further cooled with one or more additional quenching volumes of $CO_2$; these quenching volumes undergo the RWGS reaction as well, albeit at a lower conversion rate at reduced temperature. This leads to increased overall production of CO with the same amount of energy supplied.

In specific embodiments, the dual-reactor portions are coupled so that an external waste heat boiler after the POx section is unnecessary, as much of the heat from the high temperature intermediate product is transferred to the catalytic reactor. Downstream, the hot CO-rich syngas is used to further preheat fresh feeds into the system while cooling the syngas for further separation steps. The overall system is designed to work in a closed-loop manner, where soot, corrosion-inhibiting chemicals such as hydrogen sulfide, and other organic impurities are separated from the product syngas stream and sent back to the POx reactor for reuse; certain byproducts can be also sent downstream to be converted to other commercial chemical products. Hydrogen can also be separated from the output syngas, and this can be added back into the renewable hydrogen feed input of the first catalytic reactor. Similarly, unreacted and/or produced $CO_2$ can be routed back to both the first and second reactor as an input for additional chances to undergo conversion. Overall, the system achieves a near total conversion of captured $CO_2$ and hydrocarbons to CO for later valorization at high efficiency. This high efficiency is gained by keeping the shift equilibrium temperature high in both reactors to convert a high percentage of $CO_2$, and also by avoiding conditions that promote or catalyze the forward water gas shift (FWGS) reaction. Note that the water gas shift reaction is an equilibrium reaction; for clarity, the terms FWGS and RWGS will be used to denote which reaction direction is being discussed.

Previous dual reactor systems have been used for hydrocarbon processing that use a coupled GHR section along with a POx section that uses heat to drive the GHR section. However, these systems do not address the issue of preventing the FWGS reaction. In fact, they are often configured to promote this reaction as the desired product is commonly hydrogen. In those systems, the GHR is used to reform hydrocarbons using SMR, and residual hydrocarbons are passed to a POx reactor that is coupled in a similar manner as described herein, but no additional carbon-containing feedstock is used in the POx reactor. Unlike in specific embodiments of the present invention, a high excess of steam is added into both reactors, first to assure high conversion of hydrocarbons in the GHR, and next to facilitate the FWGS reaction to the POx section to react CO created from the SMR and POx reactions as much as possible to create a high hydrogen output. Maximizing hydrogen production also increases production of $CO_2$, thereby increasing their carbon footprint. In contrast, in specific embodiments of the invention, more carbon-containing feedstock in the form of $CO_2$ can be added to the POx reactor at one or more inputs to further drive the RWGS forward. In specific embodiments of the invention, the carbon footprint of the dual reactor process as outlined is minimized. The system produces less $CO_2$ by avoiding addition of steam to the reactors which would promote the FWGS. The system can also produce less $CO_2$ overall than conventional systems as it does not use either natural gas burners or electrical heating in either reactor to promote the RWGS reaction.

In specific embodiments of the invention, the output of the first catalytic reactor can be sent directly as input to the second POx reactor. Unreacted hydrocarbon that was an input to the first reactor also acts as a feedstock to heat up the second reactor to a desired temperature. In specific embodiments, the output of the first catalytic reactor can be wholly or partially decoupled from the second reactor. In a first example, the first catalytic reactor can be set up with $CO_2$ and hydrogen as an input without an additional hydrocarbon. In this case, $CO_2$ can be converted to CO and combined with the output of the second reactor, where the input feed of the second reactor can be methane or other hydrocarbons along with more volumes of $CO_2$. In another example, the first reactor could be configured to process hydrogen, $CO_2$, and methane as previously described, but the output of the first reactor could be directed to an intermediate step to separate CO and/or water produced in the first reactor before sending the output toward the second reactor. In both examples, heat from the reaction products of the second POx reactor can still be used to drive endothermic reactions in the first catalytic reactor.

In specific embodiments of the invention, a method is provided. The method includes supplying hydrogen, a first amount of carbon dioxide, and a first amount of methane to the input stream of a first chamber, wherein the first chamber contains a catalyst and is part of a catalytic reactor. The method also includes converting the first amount of carbon dioxide into a first amount of carbon monoxide in the first chamber via a reverse water gas shift reaction in the first chamber and converting at least a portion of the first amount of methane into a second amount of carbon monoxide in the first chamber via a steam reforming reaction. The method also includes supplying oxygen and a second amount of carbon dioxide to a second input stream of a second chamber. The second chamber is part of a partial oxidation reactor. The method also includes converting the second amount of carbon dioxide into a third amount of carbon monoxide in the second chamber via a reverse water gas shift reaction in the second chamber. The method also includes transporting an output stream of the partial oxidation reactor through an outer chamber of the catalytic reactor to facilitate the reverse water gas shift reaction in the first chamber and the steam reforming reaction in the first chamber.

In specific embodiments of the invention, another method is provided. The method includes supplying an input stream to a first chamber, wherein the first chamber contains a catalyst and is part of a catalytic reactor. The method also includes converting a carbon containing chemical in the input stream into a first amount of carbon monoxide in the first chamber via an endothermic reaction. The method also includes supplying oxygen and a first amount of carbon dioxide to the input stream of a second chamber, wherein the second chamber is part of a partial oxidation reactor. The method also includes converting the first amount of carbon dioxide into a second amount of carbon monoxide in the second reaction chamber. The method also includes quenching an output stream of the partial oxidation reactor using a second amount of carbon dioxide and a first amount of a corrosion-inhibiting compound, and transporting the output stream of the partial oxidation reactor, after quenching the output stream using the second amount of carbon dioxide and the first amount of corrosion-inhibiting compound, to an outer chamber of the catalytic reactor to facilitate the endothermic reaction and to coat a surface within the outer chamber.

In specific embodiments of the invention, a system is provided. The system includes a catalytic reactor including a first chamber containing a catalyst configured to convert a first amount of carbon dioxide and a first amount of hydrogen to a first amount of carbon monoxide via the reverse water gas shift reaction and a second chamber sealed from the first chamber to prevent gaseous and liquid transport between the first and second chambers but allowing heat transfer between the first and second chambers. The system also includes a partial oxidation reactor including a third chamber comprising a first section configured to react oxygen with methane via a partial oxidation reaction and to react carbon dioxide with hydrogen via a reverse water gas shift reaction. The first section includes a first inlet for reactant gases, a second inlet for oxygen, and a third inlet for a second amount of carbon dioxide. The system also includes a second section. The second section includes a fourth inlet for admitting a third amount of carbon dioxide for quenching reactant gases from the first section of the third chamber. The second section is configured to react a portion of the third amount of carbon dioxide with hydrogen while quenching the reactant gases. The system also includes a first conduit between the outlet of the first chamber in the catalytic reactor and the first inlet for reactant gases in the first section of the partial oxidation reactor, and a second conduit between the outlet of the third chamber in the partial oxidation reactor and the second chamber in the catalytic reactor. The third chamber in the partial oxidation reactor contains no catalyst. The partial oxidation reaction occurs at a higher temperature than the reaction in the first chamber. Heat transferred from output gases in the second chamber to the first chamber facilitates endothermic reactions in the first chamber.

BRIEF DESCRIPTION OF THE DRAWINGS

The accompanying drawings illustrate various embodiments of systems, methods, and various other aspects of the disclosure. A person with ordinary skills in the art will appreciate that the illustrated element boundaries (e.g., boxes, groups of boxes, or other shapes) in the figures represent one example of the boundaries. It may be that in some examples one element may be designed as multiple elements or that multiple elements may be designed as one element. In some examples, an element shown as an internal component of one element may be implemented as an external component in another, and vice versa. Furthermore, elements may not be drawn to scale. Non-limiting and non-exhaustive descriptions are described with reference to the following drawings. The components in the figures are not necessarily to scale, emphasis instead being placed upon illustrating principles.

FIG. 1 provides a diagram of a system for conversion of $CO_2$ to CO in accordance with specific embodiments of the inventions disclosed herein.

FIG. 5 provides a diagram showing an acid-gas removal (AGR) and syngas separation section of the system of FIG. 1 in accordance with specific embodiments of the inventions disclosed herein.

DETAILED DESCRIPTION

Figure 2:
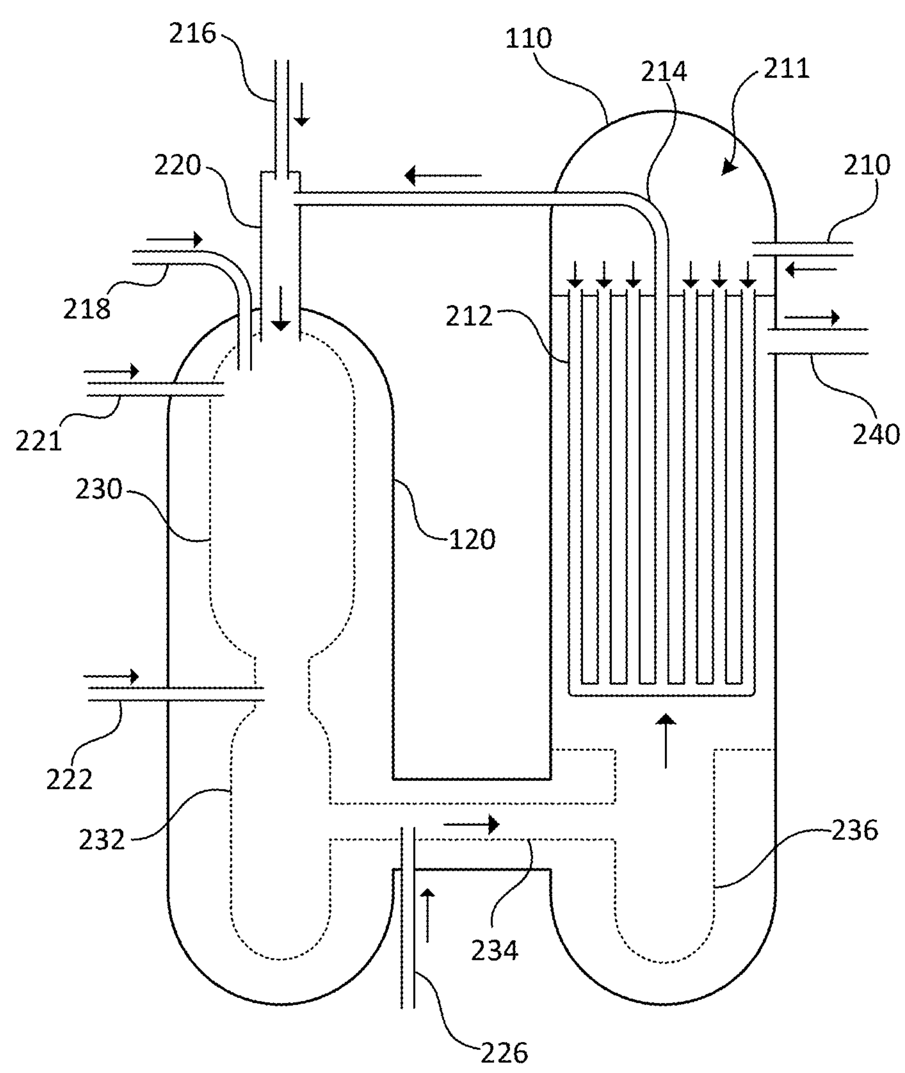
FIG. 2 provides a detailed diagram of a portion of the system of FIG. 1 containing dual coupled reactors in accordance with specific embodiments of the inventions disclosed herein.

Reference will now be made in detail to implementations and embodiments of various aspects and variations of systems and methods described herein. Although several exemplary variations of the systems and methods are described herein, other variations of the systems and methods may include aspects of the systems and methods described herein combined in any suitable manner having combinations of all or some of the aspects described.

Methods and systems related to reactors directed to conversion of $CO_2$ into CO in accordance with the summary above are disclosed in detail herein. The reactors used in accordance with the approaches disclosed herein can have various architectures. Systems used in concert with the reactors can separate, heat/cool, regenerate, and recycle various intermediate products. Though the primary product of these systems remains CO as produced from $CO_2$, other inputs such as hydrocarbons can also provide CO output as well. Other useful chemicals can be produced in various treatment or recycling areas.

FIG. 1 illustrates a high-level diagram of a system 100 designed for the conversion of $CO_2$ into CO and other products according to specific embodiments of the invention. System 100 incorporates separation stages and gas recycling to enhance efficiency and purity of various products. Processing of gas in the system begins with a first catalytic reactor 110. Preheated feed gas 136 can contain amounts of methane, hydrogen, and $CO_2$. Note that in the following discussions, methane will be listed as the primary hydrocarbon as it has simple reactions with few adverse reactions such as coking, but in specific embodiments, other light hydrocarbons as found in natural gas can also be present and undergo similar reactions. The catalytic reactor has a sealed section with, for example, gas-heated tubes containing a catalyst as a GHR. Inside the gas-heated tubes, a catalyst and heat from the hot product syngas cause a portion of the $CO_2$, hydrogen, methane, and produced water vapor to react following the endothermic reactions listed below:

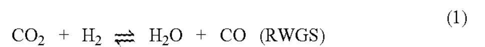
(1)

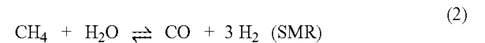
(2)

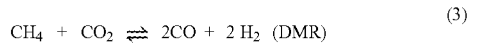
(3)

Equation (1) is the equilibrium form of the RWGS reaction. Without a catalyst present, this is an endothermic reaction that is favored to shift to the right to produce water and CO at high temperatures. The presence of a catalyst that promotes RWGS allows this reaction to proceed at the lower temperatures present in the gas-heated tubes. A volume of methane can also be present and react according to Eqs. 2 and 3 above. Some portion of the methane can react using DMR, though the SMR reaction is more thermodynamically favorable. Unlike other GHRs that primarily process hydrocarbons, the SMR reaction in the illustrated system is less of a focus, since additional water as steam is not generally added here when $CO_2$ is provided as an input. In this case, water for the SMR reaction is provided by the RWGS reaction of incoming $CO_2$ and hydrogen. The steam generated in situ from the RWGS as well as high hydrogen content in the input feed promote soot-free operation within the first reactor with no catalyst fouling by coke through the Boudouard reaction or methane pyrolysis. The presence of methane has several beneficial effects in the overall system. For example, as illustrated, system 100 includes a second POx reactor 120 which can be a non-catalytic POx reactor. The partial oxidation of the methane in this second reactor provides heat energy to drive reactions forward in both reactions. As another example, in the first reactor, conversion of water using methane via the SMR reaction helps drive the RWGS further to completion by removing a reaction product. Although SMR also produces CO which is also a reaction product of RWGS, it provides a relatively greater amount of additional hydrogen to shift the RWGS toward more reaction of $CO_2$. Furthermore, if the water product is not provided to the second reactor where additional RWGS reactions can take place, this promotes a favorable environment for RWGS there as well. In specific embodiments, methane can be only partially reacted in the first reactor to create a methane-rich syngas which can be provided to the second POx reactor 120.

In specific embodiments, a second catalyst can be present in the catalyst tubes to promote the SMR reaction of methane or other hydrocarbons introduced into the catalytic reactor. This can facilitate more complete removal of water from the output of the catalytic reactor. In specific embodiments, a catalyst can be present in the catalyst tubes to promote the SMR reaction of hydrocarbons, whereas a catalyst promoting the RWGS reaction is omitted. This configuration could be used in a system where the amount of $CO_2$ introduced into the input of the catalyst tubes is small or nonexistent; in that case, the focus of the first catalytic reactor would be more on using the heat from the second (e.g., POx) reactor to reform hydrocarbons and/or convert them to CO using SMR and/or DMR. When SMR is desired and little or no water is produced by RWGS of $CO_2$, then additional water can be supplied as steam to the preheated feed gas 136.

In specific embodiments, the output 114 of the catalytic reaction, which can be a methane-rich syngas, is routed to the input of the second POx reactor 120. The second POx reactor 120 can be a non-catalytic POx reactor. A volume of oxygen 118 is also added to the input of the second reactor. Also input to the second POx reactor 120 is a second amount of $CO_2$ in input 116. The volume of oxygen 118 can be carefully matched to the amount of residual methane present in output 114 so that partial oxidation occurs in the reactor rather than full combustion. The amount of oxygen present also affects the temperature of the second reactor, where a temperature of up to 1500° C. can be maintained with standard uncooled refractory systems. At these temperatures, 60% or more of the second amount of $CO_2$ in input 116 can be converted to CO. Higher temperatures are possible as the RWGS conversion of $CO_2$ to CO is increased as the temperature increases, but additional cooling or other refractory materials may be necessary. Oxygen can be preheated and compressed before entering the reactor. In some cases, oxygen may be provided as a relatively pure output from a water or oxocarbon electrolyzer, whereupon it can be dried, heated, and compressed before use. Hydrogen for the RWGS in the second reactor can be provided in the methane-rich syngas output 114 where much of it may be unreacted from the preheated feed gas 136. In addition, new hydrogen is created in the reactor by the POx reaction:

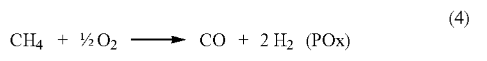

$$CH_4 + \tfrac{1}{2}O_2 \longrightarrow CO + 2H_2 \text{ (POx)} \quad (4)$$

The highly exothermic POx reaction not only provides heat energy for the RWGS reaction in both reactors, but the additional hydrogen created helps drive the RWGS reaction equilibrium favorably to convert a higher percentage of $CO_2$ to CO. This is primarily because two units of hydrogen are created for every unit of CO produced. The POx and RWGS reactions can occur in a single chamber in the second reactor, or in some cases portions can occur through multiple chambers in the two reactors.

Additional $CO_2$ can also optionally contain a corrosion-inhibiting chemical, for example, hydrogen sulfide ($H_2S$). For simplicity, $H_2S$ will be discussed in general herein as the chemical used, but other corrosion-inhibiting chemicals can be used in the second reactor in various inputs. Some chemicals containing sulfur, such as carbonyl sulfide, $CS_2$, mercaptans, thioethers, or sulfur vapor can be used to give a similar sulfide scale on metal portions as does $H_2S$, though the reactions to regenerate the corrosion-inhibiting chemical later in the system may vary from processes as described later. Phosphine or phosphine variants may also be used, although downstream processing of output gases containing these is less straightforward than sulfur-containing chemicals, and temperature in the final quenching chamber must be controlled to prevent breakdown of the chemical. Sulfur-containing chemicals will likely be present in the system in some capacity nevertheless, as $CO_2$ feed gas, natural gas, and makeup hydrogen can contain some percentage of sulfur as hydrogen sulfide or another form. Even after removal, some amounts will be present in the system.

Later sections may separate out impurities from the CO-rich gas output for removal or reuse. Feed $CO_2$ and other feedstocks, for example, biogas or natural gas, may contain nitrogen, which can react with hydrogen to create a trace amount of ammonia. Ammonia may react with CO to form cyanides such as hydrogen cyanide (HCN). The RWGS reaction produces appreciable amounts of water as steam, and CO can also react with this steam during syngas cooling to produce formic acid. In specific embodiments, impurities such as soot, HCN, $H_2S$, ammonia, formic acid, and other organic compounds can be recycled along one or more waste feeds such as output stream 154 from a soot/water system 150, or output stream 146 after the syngas separation process 140. These impurities can be reused as input to the POx portion of the second reactor. For instance, recycling the soot enables additional CO production as the carbon can also react with oxygen 118 to produce more CO. Impurities can be added near the beginning of the reactor into input 116, but they may also be present in later $CO_2$ inputs. Any of the feed streams can be exposed to high temperature with sufficient residence time to convert most or all of organics present to CO and hydrogen. Nitrogen gas and ammonia can be removed from the syngas output downstream.

In specific embodiments, one or more additional volumes of $CO_2$ can be added to provide quenching of the reactant gases to a lower temperature. A third portion of $CO_2$ can be added after the POx section of the reactor via input 122. This cools down the gas mixture from, for example, 1500° C. to 1200° C. A portion of this third volume of $CO_2$ is also converted to CO via the RWGS reaction. In a non-catalytic reactor such as the second reactor, the RWGS is dominated by thermodynamic factors, and thus the conversion rate is typically lower at this temperature (between 30-50%). One or more quenching streams of $CO_2$ can be further added to the output reactant gas mixture. Another quenching stream with a fourth volume of $CO_2$ can be added via input 126 in a chamber external to the sealed tubes of the catalytic reactor 110 after the partially quenched syngas is moved through a transport connection 124. In this example, the quenching stream of input 126 is added to the catalytic reactor portion, but in other variants, it could be added in the transport connection 124 or in a later portion of the POx reactor 120. The fourth volume of $CO_2$ from input 126 further cools the reactant gases down to at least 1000° C., which is the maximum allowable inlet temperature of the gas heated reformer tubes. At this temperature, a further portion of $CO_2$ from the fourth volume can still be converted to CO via the RWGS reaction, though the percentage may be much less (e.g. 0-30%). Nevertheless, the $CO_2$ in both quenching sections stabilizes the syngas mixture so there is less thermodynamical driving force for the FWGS reaction as the mixture cools (i.e., the additional $CO_2$ present shifts the equilibrium to favor the RWGS). Furthermore, the FWGS reaction is affected by $CO_2$ quenching as the reaction is kinetically limited. A slow temperature drop of the gas mixture could result in more CO being converted back to $CO_2$. By cooling the reactant gas output stream quickly, there is less time for the FWGS reaction to take place before the stream is routed to later cooling and processing steps. In specific embodiments, the second, third, or fourth of the volumes of carbon dioxide can include hydrogen sulfide. All of them may have some $H_2S$, but in some cases, only some of the one or more volumes may contain it. In specific embodiments, $CO_2$ feed gas can be preheated before being supplied to the POx reactor in input 116, input 122, and input 126. The preheating can occur in the syngas cooling and scrubbing process 130.

The quenched syngas can then be routed to the shell side of the GHR catalytic reactor which is external to the catalyst tubes. The outside shell of the catalytic reactor can be refractory lined, but the catalyst tubes should be configured to efficiently transmit heat from the quenched syngas to the cooler feed gas 136 entering the tubes. In this section, the temperature of the CO-rich syngas can be cooled down to 400° C. The catalyst tubes can be made of iron, nickel, or another metal with good heat transfer characteristics. The cooling of the quenched syngas is relatively quick in this section. As mentioned previously, it is not uncommon for a CO-rich syngas to undergo the FWGS reaction and lose some of the previously converted CO. In those cases where hydrogen was the desired product, this is a desirable outcome, but in this case, it should be avoided as much as possible. In specific embodiments, the corrosion-inhibiting compound can also poison catalyst sites that would otherwise catalyze the FWGS reaction of CO. At lower temperatures (below 700° C.) the Boudouard reaction of CO to create $CO_2$ and carbon soot becomes more thermodynamically favorable.

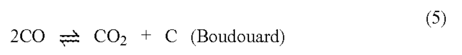

$$2CO \rightleftharpoons CO_2 + C \text{ (Boudouard)} \quad (5)$$

Eq. 5 shows the Boudouard reaction. Carbon soot formed can attack the passivating oxide layer on the GHR tube heat exchangers causing loss of metal and failure of the exchanger. $H_2S$ can be used to form a protective and passivating sulfide layer on the nickel and iron components of the heat exchanger material, and as mentioned previously, act to inhibit metal-dusting corrosion. However, it can also have a beneficial effect in this system, as the sulfide layer formed can also poison active metal sites on the iron or nickel surface that would otherwise catalyze the FWGS reaction. Inhibition of the FWGS reaction is important at this point since the gas must be cooled to be further purified. In addition, although preventing catalysis of the FWGS is a primary concern, these metal surfaces can also catalyze the Boudouard reaction; passivation of the surfaces helps keep soot from depositing on the tubes. Once the output syngas has been cooled to 400° C., it is now below the temperature at which the soot formation and the FWGS reaction occur kinetically.

The CO-rich syngas can be routed to a syngas cooling and scrubbing process 130. More details on this will be provided in FIG. 4, but in general, process 130 cools and dries the syngas to a stream 138. The cooling takes place in a series of heat-exchangers, where multiple input feeds are preheated before entering the catalytic reaction as a preheated feed gas 136. In the example in FIG. 1, a sulfur-free hydrogen stream 131 can be heated by the syngas stream 128. The heated hydrogen stream 133 can then be mixed into the feed gas 136. Hydrogen stream 131 can come from an external source that has been previously purified. In some variants, system 100 can be part of a larger electrolyzer system that produces clean hydrogen for hydrogen stream 131. Certain portions of the syngas separation can also recover unreacted hydrogen that may be recycled into this stream if they have been purified sufficiently. In some systems, the source of hydrogen as feedstock may not be sulfur free; in this case, the gas feed can be treated as belonging to gas feed stream 132. Portions of the gas feed stream 132 can comprise streams from various sources which may contain an appreciable amount of sulfur. For example, methane from a natural gas feed along with recycled $CO_2$ and hydrogen may have small amounts of sulfur and can be purified using a guard bed such as one using zinc oxide (ZnO) and/or activated carbon to remove most of their sulfur before routing to heat exchangers in process 130. There may remain trace amounts of sulfur in this portion of the gas stream 134. This can be sent through a sulfur removal guard bed 135 before being mixed in with the feed gas 136. In specific embodiments, the sulfur removal guard bed 135 can work through nonrenewable chemical means (e.g. a zinc oxide absorber), so removing as much sulfur from incoming gas streams will extend its lifetime. A $CO_2$ feed 137 can also be routed through the same heat exchangers to create a preheated feed 139. Feed 139 can be split and supplied to POx input 116, input 122, and/or input 126.

CO-rich syngas can also be sent to a scrubber as part of process 130, where recycled water 152 from a soot/water system 150 is used to remove any soot formed in the POx reactor and subsequent steps from the CO-rich syngas. The scrubber can also remove a portion of other compounds present in the CO-rich syngas, for example, ammonia, $H_2S$, and HCN. Soot-filled water 153 can be sent back to the soot/water system 150. More details of these processes will be outlined in FIG. 4.

In specific embodiments, the cool dried syngas of stream 138 can then be sent to an AGR and gas separation process 140. Purified CO output 142 can be sent for downstream processing or other uses such as feedstock to a CO electrolyzer. Hydrogen 144 can be recycled back to the catalytic reactor into hydrogen stream 131, though some of the hydrogen may be used in other parts of the process, for example the AGR or pressure-swing absorber (PSA) purging. Impurities can be sent over one or more lines of stream 146 to the POx reactor for recycling. A soot/water system 150 as mentioned can process and recycle scrubbing water, but it can also produce useful chemicals from what would otherwise be waste products. Since a great deal of water is created by the RWGS reaction in the dual reactors, the soot/water system 150 can also purify the resulting water and send it as a purified water stream for use in an electrolyzer or another application. Furthermore, the AGR portion of process 140 can produce a liquid $CO_2$ stream 148 that can carry removed soot from the soot/water system to be recycled back through stream 154 as another input to the POx reactor 120 as mentioned previously.

FIG. 2 illustrates further details in a close-up diagram of the dual reactor portion of the system according to specific embodiments. Dual reactor subsystem 200 comprises a first catalytic reactor 110 and a second non-catalytic POx reactor 120. Input feed gas 136 enters through a tube as input 210. This example shows a single input 210, but in some embodiments, various gases could be added in different inputs or routed in different ways. Inputs such as input 210 can feed into a mixing chamber 211 or can be directly connected to one or more catalyst-filled tubes 212. In this example, a series of parallel vertical tubes 212 are shown with a single output 214 leading upwards, where the incoming gas flows counter to heated gas flowing upward from chamber 236. A counterflow of heating gas and reactant gas can allow the most efficient transfer of heat to the incoming gases to bring the temperature of the reactant gas close to the heating gas input temperature. This may lead to higher conversion rates for one or more of the reactions in the catalytic reactor. In specific embodiments, incoming gas can flow in the same direction as heating gas; this may not be as efficient as a counterflow setup but may lead to fewer temperature shocks in the gas or catalyst. The configuration as depicted has an output tube leading back up vertically to the top of the reactor, but in some embodiments, each tube has a separate flow back up (e.g. a U-bend near the bottom) to give a long traversal for reactant gases in this reactor. In other embodiments, the flow can be completely counter to the heating gas, where the output 214 exits the reactor near the bottom of the catalyst tubes rather than back at the top. These variations may lead to different temperature patterns inside the catalyst tubes, such as a relatively uniform temperature or otherwise different temperatures along the tube. In specific embodiments, to account for temperature variants, different amounts of catalyst can be loaded in various portions of the tube (e.g. more catalyst can be placed in areas where the reactant gases are hotter).

In specific embodiments, configurations other than vertical tubes can be used in the catalytic reactor, such as in a helical fashion. In some variants, heating gas can also go through sets of tubes placed in contact with catalyst tubes. Heating gas tubes can be placed parallel and interleaving among the catalyst tubes or can be placed coaxially (i.e. a heating tube surrounds a catalyst tube). In one further variant, the catalyst and heating portions can be run through alternating parallel plates rather than tubes.

After exiting the first reactor through output 214, the methane-rich syngas can enter the second POx reactor 120. In the example shown, output 214 and a $CO_2$ input port 216 are connected to an input manifold 220, although each input could separately enter the POx reactor chamber. The second volume of $CO_2$ feed gas in input 116 enters the top of the reactor at port 216. Preheated oxygen 118 also enters through the top into port 218. Other waste feeds such as the one or more lines of stream 146 and stream 154 can also enter near the top of the reactor at port 221, although these might enter through an input manifold 220 as well.

In specific embodiments, the interior of the POx reactor 120 can be open as one chamber. In specific embodiments, the interior of the POx reactor can have more than one chamber for various functions. In the example of FIG. 2, the POx reaction largely happens in a high-temperature POx chamber 230 along with additional $CO_2$ being converted to CO. The hot gas mixture then passes to a quenching and reaction chamber 232 as $CO_2$ input 122 is added to the mixture through port 222. The shape of the chamber 232 can be chosen to promote mixing of the quench gases with the reactant gases; the shape may also allow a longer residence time in the chamber to allow a greater amount of newly added $CO_2$ to react via the RWGS reaction. A third chamber 236 is shown here at the bottom of the catalytic reactor 110, although in some cases, this chamber might be placed in the POx reactor as well. An input port 226 allows the addition of a fourth volume of $CO_2$ from input 126 to the partially quenched syngas from the transport connection 124. The figures show the port 226 as adding into a connection tube 234, but this could also be placed in the entrance of chamber 236. After cooling and further RWGS reactions of the fourth volume of $CO_2$ from input 126, the cooled CO-rich syngas can travel around the catalyst tubes 212 to heat incoming gases for the first reactor as it is cooled for later processing. The cooled CO-rich syngas may exit the catalytic reactor 110 via stream 240.

In any of the dual reactor configurations, the portion of the catalytic reactor including the catalyst tubes is considered the "clean" portion of the dual reactor, whereas the POx reactor and external portions of the catalytic reactor can be "dirty". Herein, "clean" is defined as not having a substantial amount of soot or $H_2S$. Either of these substances can reduce the effectiveness of the RWGS catalyst. The "dirty" side of the dual reactor can contain both soot and $H_2S$. Though conditions can be adjusted to minimize soot creation in the POx chamber and later chambers including the outside of the catalyst tubes, some soot is almost always generated using these reactions and temperature ranges. The system is designed to separate out and recycle the soot and oxidize it back to CO or else $CO_2$ where it can be reacted again. As previously mentioned, $H_2S$ on the dirty side has beneficial effects; typically, an excess is present in the system overall to achieve this where $H_2S$ can be either recycled from the syngas output stream or regenerated and added into $CO_2$ feed gas.

Figure 3:
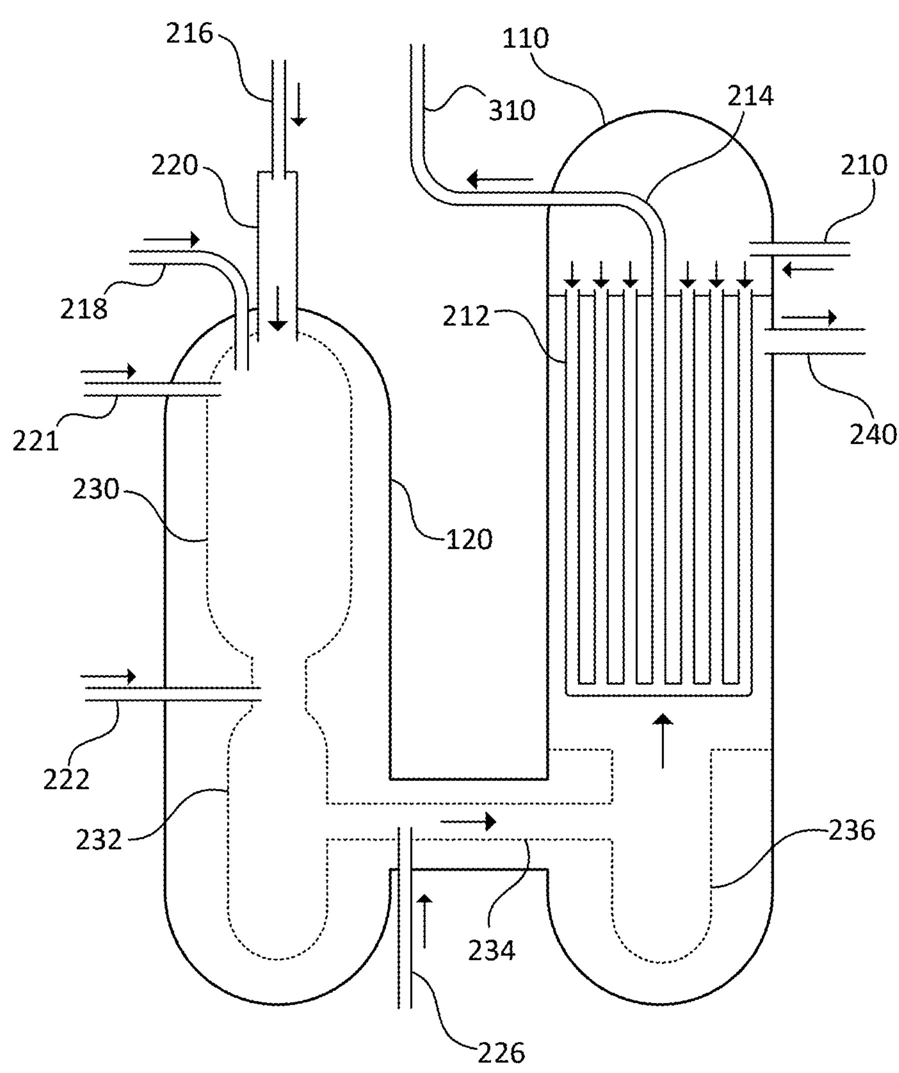
FIG. 3 provides a detailed diagram of a variant of the dual reactors shown in FIG. 2 in accordance with specific embodiments of the inventions disclosed herein.

FIG. 3 illustrates a close-up diagram of a variation of the dual reactor portion of the system according to specific embodiments. Dual reactor subsystem 300 is similar in most ways to subsystem 200. However, the output 214 tube is redirected to an output port 310 instead of traveling directly to the second reactor. In specific embodiments, reactant gases from output port 310 can be processed separately before being reintroduced as an input to POx reactor 120. In other embodiments, output gases can be separately valorized without returning to the POx reactor 120. In this case, a separate source of hydrocarbons can be used to fuel the POx reactor and added to incoming $CO_2$ at port 216.

Figure 4:
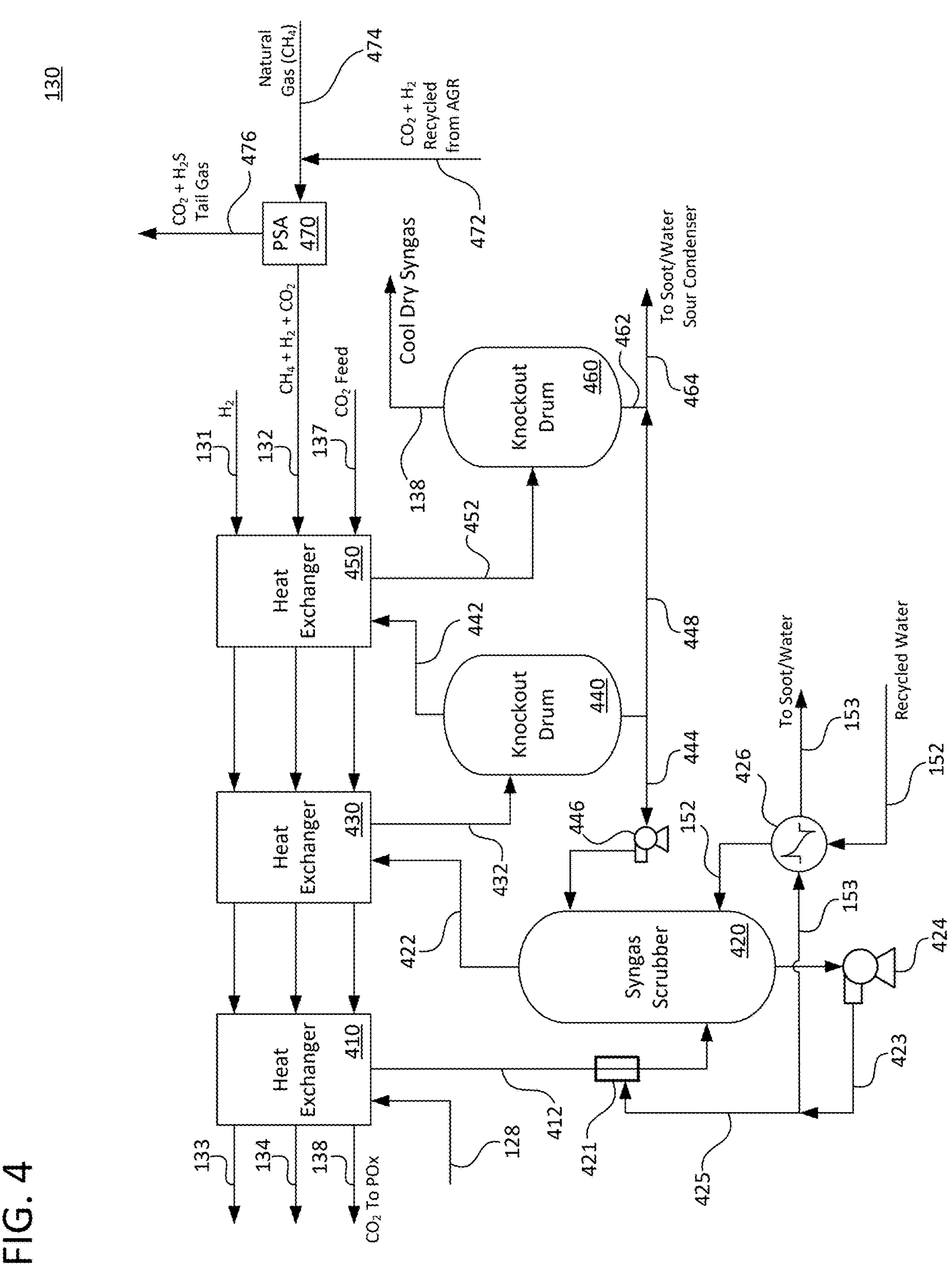
FIG. 4 provides a diagram showing a syngas cooling and scrubbing section of the system of FIG. 1 in accordance with specific embodiments of the inventions disclosed herein.

FIG. 4 illustrates further details of the syngas cooling and scrubbing process 130 of the system according to specific embodiments. The heated CO-rich syngas stream 128 enters a series of heat exchangers (e.g., heat exchanger 450, heat exchanger 430, and heat exchanger 410) to cool down the output gas as well as preheat the various feed gas streams. Other processing steps can be accomplished in between heat exchangers. In the example shown in FIG. 4, three heat exchangers are used with a scrubber and two condensers. The three feed gas streams are the same as depicted in FIG. 1, with a largely sulfur-free hydrogen stream 131, a mixed gas feed stream 132 containing methane, hydrogen, and $CO_2$, and a $CO_2$ feed 137, with heated final stream 133, stream 134, and stream 138 respectively. In specific embodiments, gas feed stream 132 can have much of its sulfur removed before entering the heat exchangers. Natural gas 474 containing methane can be mixed with a $CO_2$ and hydrogen stream 472 recycled from the AGR unit 510, described with reference to FIG. 5. This can be passed through a PSA 470, which may be selected to have high absorption selectivity of $H_2S$ over $CO_2$, for example, ultra-stable Y-type (USY) zeolite. This removes most of the $H_2S$ from the stream, which as previously mentioned, extends the lifetime of the sulfur remover guard bed 135. Low pressure PSA tail gas stream 476 contains $H_2S$ and potentially $CO_2$ and is routed to the separation process 140 for compression and recycling.

CO-rich syngas stream 128 exits the dual reactor at around 400° C. In the first heat exchanger 410, it can be cooled down to within 50° C. of the water dewpoint (typically cooled to 230-275° C.) to prevent sticky solids, such as water droplets, combining with soot and water soluble gas components which could foul the heat exchangers. The CO-rich syngas stream 412 is then routed to a syngas scrubber 420 where water is used to wash essentially all the soot out of the syngas. The water can also dissolve a portion of water-soluble gases present in CO-rich syngas stream 412 such as ammonia, $H_2S$, and HCN. Condensate 444 from the downstream low temperature gas cooling (LTGC) section is used to counter-currently contact the syngas through trays, sprays, dip tubes, and nozzle scrubbers to rapidly mix the CO-rich syngas with excess water ensuring that no dry sticky solids form in the scrubbing equipment. Water 423 from the bottom of the scrubber 420 is recirculated with a pump 424. Most of this soot-filled water 153 passes through a blowdown cooler 426 to the soot/water system 150. The blowdown cooler also purges solids to control the solids content in the recirculating scrubber water to within, for example, 1-5 wt % of solids. Optionally, a portion of the scrubbing water 425 can contact the syngas in CO-rich syngas stream 412 at 421 to saturate the gas with water. In addition to the condensate 444, recycled gray water 152 is heated in a heat exchanger with incoming gray water before being added to the scrubbing equipment. This additional recycled water minimizes the need for makeup condensate.

Syngas stream 422 exits the scrubber and is directed to a second heat exchanger 430. Incoming gas feeds further cool the syngas stream 432 to around 150-180° C. and condense half or more of the water in the syngas. Optionally, a medium-pressure steam boiler can be added to this stage to produce steam to preheat oxygen or other recycle streams in the system. A knockout drum 440 can remove the condensate; as previously mentioned, a portion of the condensate 444 is routed to the scrubber 420 using a pump 446. Syngas stream 442 passes to a third set of heat exchangers 450 which cool the syngas to approximately 70-100° C. Optionally, and particularly when the syngas is still hotter than 100° C., a low-pressure steam boiler can be added to this stage to extract additional heat to preheat oxygen or other recycle streams in the system. Output stream 452 may pass from the heat exchanger 450 to the knockout drum 460. Condensate 462 can be mixed with another condensate portion 448 and sent to the soot/water system 150 for further processing. Gas stream 138 can be further cooled with a trim water cooler to 30° C. and routed to the AGR and syngas separation process 140.

FIG. 5 illustrates further details of the AGR and syngas separation process 140 of the system according to specific embodiments. CO-rich syngas stream 138 may contain trace amounts of soot, HCN, $H_2S$, ammonia, and formic acid that remain after the scrubber 420. The syngas stream 138 enters separation process 140 through an AGR unit 510. The AGR unit can use a lean solvent to extract most if not all $CO_2$ and $H_2S$ in the gas mixture. In specific embodiments, the AGR unit 510 can use a chemical absorbent as the lean solvent, for example an amine absorber such as monoethanolamine (MEA). In other embodiments, the AGR unit can use a physical solvent as the lean solvent, for example, using the Rectisol process. In some cases, the physical solvent can eliminate the need for trace acid and ammonia scrubbers described later in this portion. In some embodiments, the lean solvent can be stripped using medium pressure (MP) hydrogen stream 546 generated downstream. The hydrogen, $CO_2$, and removed $H_2S$ stream 472 are sent to PSA 470 for sulfur removal and recycling. The AGR unit 510 also can produce a liquid $CO_2$ stream 148, which can be sent to the soot/water system 150 for soot extraction and recycling. Depending on the solvents used, CO-rich syngas output stream 512 should have less than 1000 ppm $CO_2$ and less than 10 ppm $H_2S$. In some cases, $CO_2$ levels can be less than 10 ppm, and $H_2S$ levels less than 1 ppm.

The syngas separation system initially uses several membranes and/or PSAs to separate the stream 512 into four streams. The first stream is a high-pressure (HP) hydrogen stream 536 that can be recycled to the catalytic reactor. The high-pressure, high-purity hydrogen stream can be readily recycled to the RWGS system without causing inert nitrogen buildup and without recycling components such as CO and methane. The second stream is an MP hydrogen stream 546 that is used in several places throughout the system for solvent stripping and purging. The medium pressure, high purity hydrogen stream is well suited as a sweep gas stream in acid gas degassing membranes and acid gas removal lean solvent stripping since it contains essentially no acid gases. The third stream is a low-pressure nitrogen purge stream 547 that is sent to a thermal oxidizer. The purge nitrogen stream has a very high nitrogen content (>50%) allowing nitrogen to be purged to a thermal oxidizer, without significant loss of valuable hydrogen, CO and methane. The fourth stream is a low-pressure CO-enriched syngas stream 548 for further processing.

In specific embodiments, a small portion of syngas 513 from stream 512 is routed to a separation membrane 520. The separation membrane 520 can be polyimide based that retains 95-99% of CO and methane. The retentate can be output stream 522 in the form of a >80 mol % CO, with some remaining hydrogen, high pressure stream at 40-80 gauge pressure (barg). Output stream 522 can be used for purging PSA 530 and PSA 540 without diluting the tail gas output. The majority of the syngas of stream 512 passes to a first PSA 530. In specific embodiments, PSA 530 uses activated carbon for methane adsorption and a copper impregnated zeolite or a copper-based metal-organic framework for CO adsorption. Tail gas 533 comprises a first portion of highly enriched CO syngas (>90% CO). Product gas 531 can be heated using a heat exchanger 532. The heat exchanger 532 can use residual heat from an electrolyzer or other components in the system. The heated product gas can then be routed to a high purity hydrogen second PSA 535 to obtain a >98% pure hydrogen stream 536 at high pressure. Tail gas 537 from the PSA 535 can be mixed with permeate 524 from the membrane 520, and then compressed with, for example, an oil-flooded screw compressor 538. This is fed into a third PSA 540, which can be substantially similar to PSA 530. Tail gas 541 has a similar composition as tail gas 533; these two streams can be combined to form the final CO-enriched syngas stream 548.

Permeate 542 is routed to a fourth PSA 545, which can be substantially similar to PSA 535. The permeate of MP hydrogen stream 546 is high-purity, similar to stream 536. Tail gas stream 547 from PSA 545 is rich in nitrogen and can be sent to a thermal oxidizer. This nitrogen purge portion prevents nitrogen from slowly building up in the system. In specific embodiments, the nitrogen purge stream 547 can be sent to a thermal oxidizer that includes an amine scrubber to recover any residual $CO_2$ in the gas.

As mentioned previously, certain implementations of the AGR unit 510 can remove nearly all $CO_2$, $H_2S$, HCN, and ammonia from the output gas. In that case, CO-enriched syngas stream 548 could be routed directly as scrubbed CO output 142. However, if contaminants remain in the syngas stream 548, they can be removed in an optional series of scrubbers. Even trace contaminants such as iron and nickel carbonyls created from the interaction of CO-rich syngas at any point upstream with piping material can damage sensitive downstream catalysts. Residual $CO_2$, $H_2S$, or HCN not captured in the AGR can also be present that can be scrubbed for removal. In specific embodiments, CO-enriched syngas stream 548 can enter a carbonyl decomposition catalyst unit 560. The catalyst in the unit 560 can be silica, silica alumina, a molecular sieve, and the like. It can decompose trace amounts of nickel and/or iron carbonyl back to CO and metal dust. Incoming gas stream 548 can be heated using a feed product heat exchanger with heat from syngas stream 561. The gas can be further heated using medium pressure steam to 240-250° C. and passed through a fixed bed reactor containing the catalyst. In some embodiments, a portion of scrubbed gas stream 563 is pumped through a blower or pump 564 near the outlet of the unit 560 to quench the gas to below 200° C. to prevent carbonyl reformation. After the catalyst unit 560, silicon barrier coatings or polytetrafluoroethylene (PTFE)-lined piping may be used to minimize further creation of carbonyls downstream.

In specific embodiments, a trace acid gas scrubber 562 can be used to remove trace acid gases and solids from the CO-rich syngas stream 561. The scrubber 562 can be a caustic scrubber, which uses a highly basic solution (e.g., pH 11) that includes sodium polysulfide. Polysulfide can be used to convert iron and/or nickel dust present in the syngas stream 561 after catalyst decomposition into iron and nickel sulfide. A portion of the basic solution can be sent to a spray scrubber near the inlet where the syngas stream 561 enters and to a packed section. The spray scrubbing stage removes iron and nickel sulfide fines along with any trace amounts of soot or catalyst fines into the liquid phase at the bottom of the scrubber. The packed section above removes any trace acid gases such as $CO_2$, $H_2S$, and HCN that remain. Polysulfide present in the scrubbing liquid may also convert adsorbed cyanide compounds to non-volatile, less-corrosive sodium thiocyanate. Any ammonia dissolved in the scrubbing liquid can be stripped out of the liquid in this packed section due to high pH (around 11) of fresh scrubbing liquid, which allows ammonia to become volatile, and the stripping action of the CO-rich syngas flow. Most of the syngas stream 563 passes to the trace ammonia scrubber 570. Bottom liquid 565 can be pumped to a backpulsed microfiltration (MF) unit 567, for example, a Gore filter with PTFE elements. The MF unit 567 removes fine solids as a concentrated slurry 569 and is periodically purged with permeate from Seawater Reverse Osmosis (SWRO) 650 in a regenerator subsystem 580 designed to regenerate the caustic solution and sulfur content. Regenerator subsystem 580 will be described in more detail in FIG. 6. Solids in the MF unit 567 can be backpulsed with a portion of MP hydrogen stream 546. A portion of the MF filtrate liquid 582 can be sent for regeneration to regenerator subsystem 580, and the remainder of the MF filtrate 566 is recycled to the scrubber 562 through a water cooler 568 to maintain a scrubbing temperature near 25° C. The scrubbing liquid is maintained at around 4 wt % caustic by adding additional caustic 584. A small amount of sodium polysulfide and sodium carbonate 586 can be added here as well before entry into the scrubber 562.

In specific embodiments, a trace ammonia scrubber 570 can be used to remove residual ammonia from the CO-rich syngas stream 563. Essentially all of the ammonia in the syngas stream 563 eventually leaves the scrubber 562, because degassing membranes in the regenerator subsystem 580 operate at acidic pH where ammonia is not volatile. In specific embodiments, it is useful to separate ammonia recovery from that of acid gases in scrubber 562. Ammonia can react with $H_2S$ and form solid ammonium hydrogen sulfide that can accumulate in various elements such as heat exchangers, compressors, membranes, piping, and other places. Ammonia can be removed from the syngas stream 563 by dilute sulfuric acid scrubbing in the scrubber 570. Bottom liquid 571 can be pumped and much of it recirculated. Dilute sulfuric acid 572 can be added to maintain the scrubbing liquid 573 between pH 4-6. A portion of the bottom liquid stream 574 is routed to the soot/water system 150 and contains a diluted ammonium sulfate solution. Piping and scrubber column materials may be either epoxy-coated steel or polypropylene lined steel to prevent trace iron or nickel carbonyl contamination at this stage. In specific embodiments, the scrubber 570 can include a pump-around condenser 575 that uses cooling water to cool the CO-rich syngas. This ensures that any ammonium sulfate carryover is captured before the syngas of CO output 142 is released for downstream applications.

In specific embodiments, separation process 140 can also process and recycle off gases from various points in the system. One input is stream 476 which was tail gas from PSA 470 comprising $CO_2$ and $H_2S$. Another input stream 550 is combined from off gas outputs of flash drums 710 and 730 in the soot/water system 150, off gas from degas membranes 820, 860, and 887 in the soot/water system 150, as well as optional degas membranes 620 and 640 in the caustic and sulfur regenerator subsystem 580. The off gas combination of stream 550 may comprise hydrogen, CO, $CO_2$, $H_2S$, HCN, and some water. The off gas stream 550 is routed to a chilled water (at around 5° C.) screw compressor system 551, where the off gas is compressed to around 10 absolute pressure (bara). The compressed gas 552 is routed to a condenser 554. A small sour condensate purge is taken from the compressor system 551 and combined with the liquid from the condenser 554. This sour condensate stream 553 is routed to the soot/water system sour condensate flash drum 710. The output gas still contains an appreciable amount of water; a small amount of makeup methanol and a small portion of condensate 558 (a recycled methanol-water mixture) is added to the compressed gas 555 to absorb residual water in the gas and also to prevent condensate from forming ice in the downstream cooling train. Feed product exchangers and a standard ammonia or other refrigerant chiller cools the gas to approximately −15° C. This causes essentially all the water and most of the methanol to condense out of the compressed off gas stream in a condenser 556. Around 1500 ppmv of methanol may remain in the off gas. Condensate 558 and dried off gas 557 can be each routed through heat exchangers to cool incoming gas 555 before being sent elsewhere.

Dried off gas 557 can be compressed to high pressure, (e.g., 100 bara) in a compression stage 559 before being sent as one line in feed stream 146 to the POx reactor 120. No sour condensate is produced in the final compression stage, allowing low-cost metallurgy to be used for compression equipment. Condensate 558 comprising water and methanol can be mixed with slurry 569 to form an output stream 592, additionally comprising metal sulfides, residual soot, and sulfur. This can similarly be routed to another line in feed stream 146 as a POx reactor input. In specific embodiments, sulfur can be added to the output stream 592 using a sulfur addition unit 590. This may be desired where $CO_2$ and natural gas feeds have a low sulfur content, and sulfur recycled through the various recycling systems that feed $H_2S$ back to the POx reactor do not generate enough $H_2S$ to fully inhibit corrosion in the reactor. A portion of the recycle slurry 569 can be added to an agitated mix tank that includes a recirculation homogenizer similar to the system used as a sulfur addition unit 660 in generation of polysulfide. Powdered sulfur can be added to the mix tank directly. SWRO permeate stream 652 can be optionally added to the mix tank if there is insufficient MF unit 567 concentrate to accommodate the desired sulfur flow to the POx reactor 120.

Figure 6:
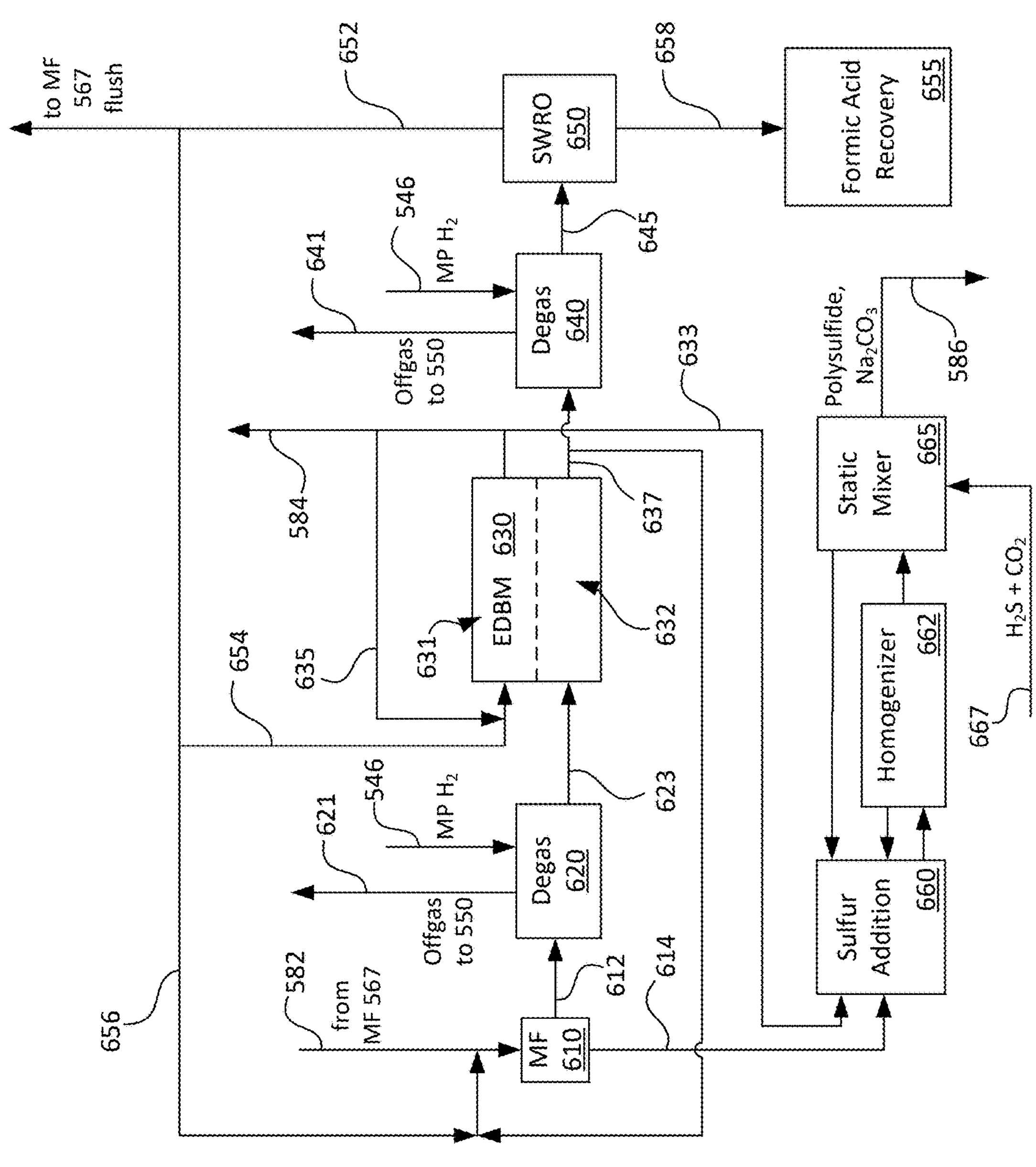
FIG. 6 provides a diagram showing details of the caustic and sulfur regenerator portion of FIG. 5 in accordance with specific embodiments of the inventions disclosed herein.

FIG. 6 illustrates further details of the caustic and sulfur regenerator subsystem 580 which is a portion of the process 140 according to specific embodiments. The regenerator subsystem 580 also acts as an acid gas recovery system. The use of this regenerator avoids the need to purchase fresh hydroxide caustics for carbonyl and acid gas removal, and also avoids purchase of polysulfides or hydrosulfides for metal carbonyl decomposition. Low-cost sulfur can be added instead if the amount of sulfur in the natural gas/$CO_2$ feeds is insufficient. Caustic scrubber liquid feed that is a portion of filtrate liquid 582 from MF unit 567 is mixed with a first portion of acidic (e.g. pH 5) effluent 637 from the Electrodialysis with Bipolar Membrane (EDBM) unit 630. This can cause remaining unreacted sodium polysulfide to decompose into $H_2S$ and solid sulfur. This acidified mixture is filtered with another MF 610, which periodically discharges solids 614 to a sulfur addition unit 660. Gases can be removed from the filtrate 612 using a degassing membrane 620 using MP hydrogen stream 546 as a sweeping gas. Off gas 621 is sent to input stream 550 for recycling as previously described. The degassed filtrate 623 is routed to a two-compartment EDBM unit 630 into the acidic side 632. Here, sodium and some ammonium can be extracted from the MF filtrate 623 to produce a regenerated dilute (e.g. 4 wt %) caustic soda in the caustic side 631 of the EDBM unit 630. Some of the caustic is recirculated back to the EDBM caustic side 631 via stream 635, and another portion of dilute caustic 633 can be sent to the sulfur addition unit 660. The remainder of caustic 584 is added back to the recirculated caustic scrubber as described previously.

The remainder of effluent 637, which can contain dissolved $CO_2$, $H_2S$, and HCN, is routed to a degas membrane 640, which, similar to membrane 620, can be swept using MP hydrogen stream 546 and off gas 641 similarly routed to input stream 550 for recycling. In specific embodiments, the degassed purge stream 645 can be routed to a high pressure (e.g., >70 barg) SWRO membrane 650 which concentrates sodium formate and sodium thiocyanate present to stream 658 to around 8-10 wt %. The SWRO also creates a permeate stream 652 which is useful for flushing MF 610 through stream 656 as well as providing an EDBM caustic makeup stream 654. A portion of stream 652 can also be used to flush MF unit 567. In specific embodiments, stream 658 can be routed to a tank and then optionally routed to a shared formic acid EDBM and distillation-based recovery system (e.g., formic acid recovery unit 655). This also produces a concentrated sodium thiocyanate solution which can be sold as a commercial commodity chemical.

Dilute caustic 633 and MF solids 614 can be added to a tank in sulfur addition unit 660. In specific embodiments, the sulfur addition unit 660 can also have a powdered sulfur that can be added to the tank. A mixer in the tank may be able to fully mix sulfur into solution, but the tank may also output to a recirculating homogenizer 662 to thoroughly distribute solid sulfur into solution or suspension. This can also be routed to a static mixer 665, where $CO_2$ and $H_2S$ volume 667 can be reacted to form sodium polysulfide and sodium carbonate 586, which is added to the trace acid gas scrubber 562 as previously described. $CO_2$ and $H_2S$ volume 667 can be a portion of output gas stream 472 from the AGR or could also be a portion of tail gas stream 476 from the PSA separator. Excess sulfur from this system can eventually migrate from the caustic scrubbing portion to the POx reactor 120, where it can supplement other $H_2S$ used for corrosion inhibition.

Figure 7:
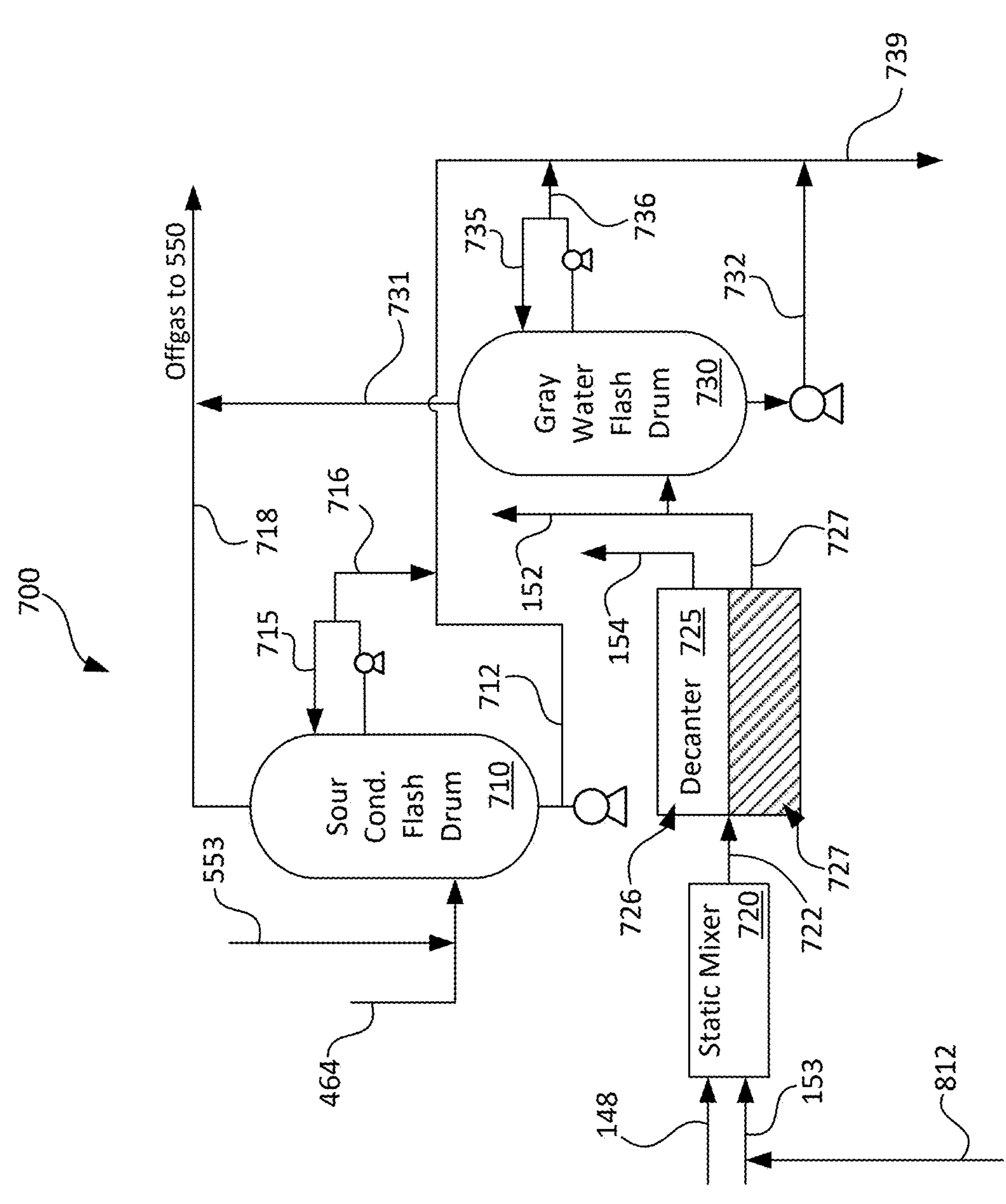
FIG. 7 provides a diagram showing one section of a soot/water subsystem of the system of FIG. 1 in accordance with specific embodiments of the inventions disclosed herein.

FIG. 7 illustrates portions of the soot/water system 150 of the system according to specific embodiments, showing the initial water and gas separation section 700 of the soot/water system 150. High-pressure condensate 464 from both of the lower temperature cooling knockout drums 440 and 460 can be mixed with sour condensate stream 553 from the off gas treatment portion of the separation process 140 and sent to a near atmospheric pressure (e.g. 1.1-1.5 bara) flash drum 710. A pumparound condenser 715 can be used with a chilled water cooler to minimize water content in the off gas 718. The pumparound condenser 715 also prevents concentration of ammonia and $H_2S$ in the off gas 718, which could potentially foul the condenser with ammonium hydrosulfide. Off gas 718 from the sour condensate flash drum 710 is combined with off gas 731 from the gray water flash drum 730 and sent to off gas processing at input stream 550. Condensates 712 and 716 from flash drum 710 are combined with condensates 732 and 736 from flash drum 730 into aqueous stream 739.

As previously mentioned, dirty scrubbing water 153 was cooled before entering the soot/water system 150. Scrubbing water 153 can be further cooled with cooling water in a trim cooler before entering a static mixer 720, along with a liquid $CO_2$ stream 148 from the AGR unit 510. This causes carbon-rich soot particles to migrate to the $CO_2$ phase with only very small inorganic material, such as pipe and tube scale, remaining in the water portion. Optionally, a black water slurry 812 separated downstream can be added to scrubbing water 153 before mixing. The output of the static mixer 720 is passed to a decanter 725 via stream 722. The decanter 725 is used to allow the carbon-rich $CO_2$ phase 726 to separate from the carbon-lean aqueous phase, which is also referred to as gray water 727. The $CO_2$ phase containing most of the carbon soot present in the syngas can now be sent over stream 154 as an input to the POx reactor where it is oxidized back to CO and $CO_2$ and will ultimately be converted to product gases.

In specific embodiments, a purge portion of the gray water 727 (which can contain dissolved HCN, $CO_2$, $H_2S$, ammonia, and ammonium formate) is routed to a sour gray water flash drum 730. The remainder of recycled water 152 is recycled to the syngas scrubber 420 as previously mentioned. Treatment in the gray water flash drum 730 controls ammonium formate concentration in the scrubbing water to <10 wt %. Gray water 727 is flashed at near-atmospheric pressure in the drum 730 and then cooled and condensed in a pumparound condenser 735. Similarly to the sour condenser flash drum 710, pumparound condenser 735 prevents concentration buildup of ammonia and $H_2S$, as well as fouling of the stripper condenser with ammonium hydrosulfide. This process avoids refluxing the dissolved acid gas and concentrating them in the condenser 735 which could lead to corrosion.

Figure 8:
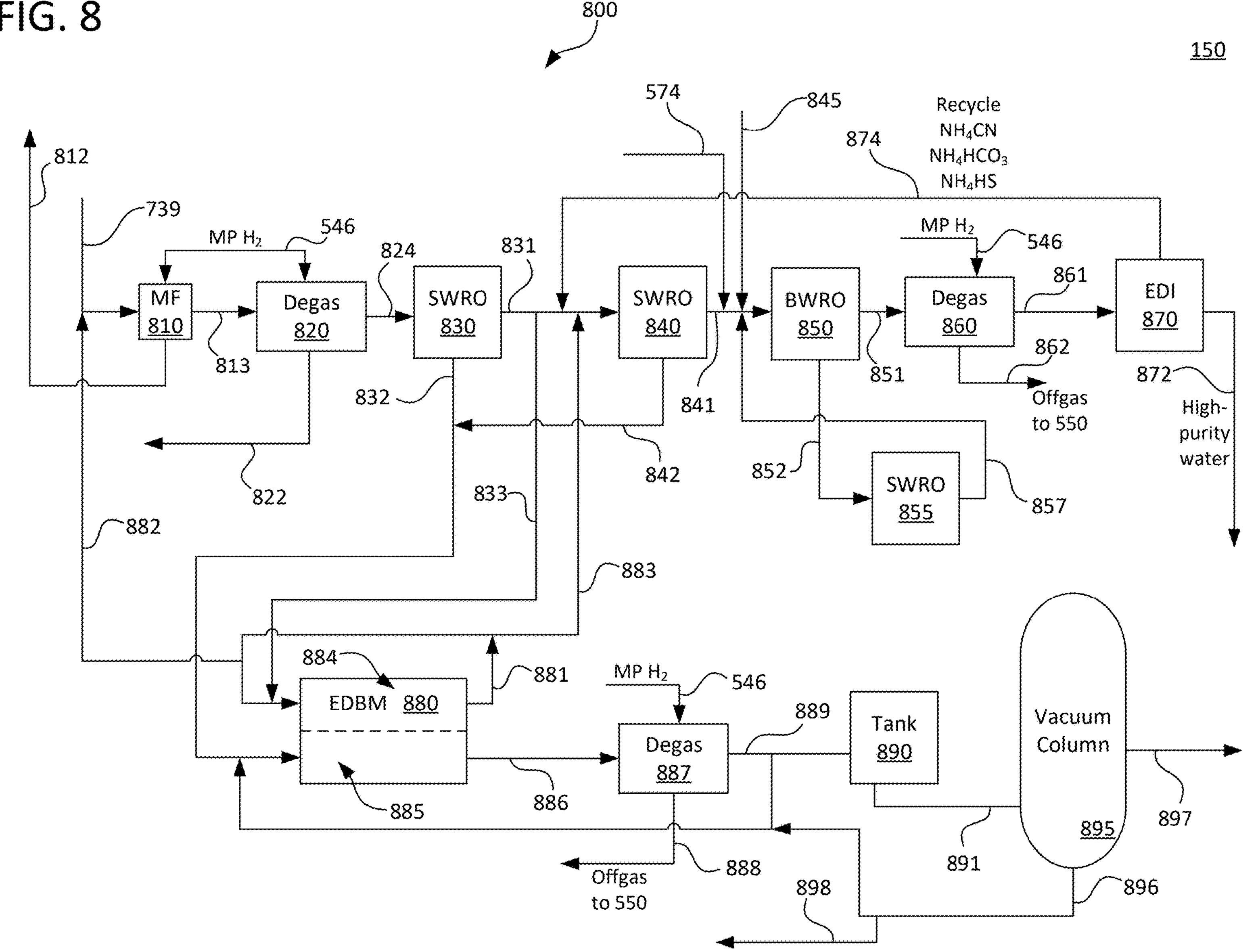
FIG. 8 provides a diagram showing a second section of a soot/water subsystem of the system of FIG. 1 in accordance with specific embodiments of the inventions disclosed herein.

A significant amount of water condensate is processed by the system, since >90% of feed hydrogen is ultimately converted to water (with a small portion output as CO-rich syngas). In addition, various purge and blowdown streams are used to prevent accumulation of dissolved gases or dissolved solids which could lead to corrosion, fouling, or plugging of equipment. FIG. 8 illustrates portions of the soot/water system 150 of the system according to specific embodiments, showing a water treatment section 800 of the soot/water system 150. Combined aqueous stream 739 from the flash drums can be processed starting with an MF unit 810. If necessary, a portion of internally produced 5 wt % ammonia water 882 is used to increase the pH to 4 to ensure that any formic acid present is converted to ammonium formate. MP hydrogen stream 546 can be used to backflush the MF unit 810 to produce a dilute (e.g. 1-5 wt %) black water slurry 812. The slurry 812 can be recycled to the static mixer 720 or decanter 725 by mixing with the stream of dirty scrubbing water 153. MF filtrate 813 can be routed to a degassing membrane 820 operating at about pH 4. The degas membrane 820 can use MP hydrogen stream 546 as a sweep gas, and off gas 822 is routed to off gas processing at input stream 550. Degassed filtrate 824 can be routed to a high-pressure (e.g. >70 barg) SWRO 830 to separate out ammonium formate and trace amounts of ammonium carbonate in concentrate 832. A portion 833 of permeate 831 can be used as makeup to downstream EDBM 880. Most of the permeate 831 is mixed with the purge stream 874 from downstream electrodeionizer (EDI) 870; purge stream 874 can contain ammonium cyanide, ammonium bicarbonate, and ammonium hydrogen sulfide. A portion of ammonia water 883 can also be mixed into permeate 831 to raise the pH to approximately 9.5, and in the process converting at least 70% of trace cyanide to ammonium cyanide. The mixture is then pumped into a second SWRO 840.

Permeate 841 from SWRO 840 still can contain some non-ionized ammonia. In specific embodiments, stream 574 containing dilute ammonium sulfate from the ammonia scrubber 570 can be mixed with the permeate 841. A volume 845 of sulfuric acid can be added as well to reduce the pH to around 6; this converts remaining ammonia to ammonium sulfate. The pH adjusted mixture is routed to a medium pressure (e.g., <40 barg) Reverse Osmosis Water System referred to as Brackish Water Reverse Osmosis (BWRO) system 850 that produces high purity water. The BWRO concentrate 852 is pumped to a third SWRO 855 to concentrate the ammonium sulfate (e.g., to 10 wt %) for sale as a commodity chemical. The permeate 857 from SWRO 855 can be recycled to the BWRO system 850 to produce more high purity water. Permeate 851 from the BWRO system 850 is routed to another degassing membrane 860 to remove any residual gases in either the ammonium sulfate stream 574 or other dissolved condensate gases. Degassing membrane 860 is operated similarly to membrane 820, where MP hydrogen stream 546 can be used as a sweep gas, and off gas 862 can be sent for recycling to input stream 550. Finally, degassed permeate 861 is sent to an EDI 870 for final purification. High purity water 872 is suitable for use in electrolyzers or other applications. As previously described, the EDI purge stream 874 is recycled to the feed stream of SWRO 840.

In specific embodiments, an EDBM can be used to generate ammonia water and recover formic acid from the water mixture. The concentrate 832 from SWRO 830 comprises ammonium formate with trace amounts of ammonium bicarbonate. Concentrate 842 from SWRO 840 comprises ammonium cyanide and a small amount of un-ionized ammonia. The mixture of concentrate 832 and concentrate 842 can be routed to the lower chamber 885 of an EDBM 880 where ammonium is extracted from the lower chamber 885. Most of the ammonia is recovered in upper chamber 884, where it is produced as stream 881, a dilute ammonia water solution (e.g. 5 wt %). Much of the ammonia water stream 881 is recirculated to the upper chamber 884 of the EDBM 880, along with a portion 833 of the SWRO 830 permeate as makeup. Other portions of ammonia water 882 and 883 can be added to the MF unit 810 feed and the SWRO 840 feed respectively. Lower chamber output 886 can be a formic acid solution that is degassed in a degassing membrane 887 in a similar manner to membrane 820, where MP hydrogen stream 546 is used as a sweep gas, and off gas 888 is sent for processing to input stream 550. Much of degassed output 889 is recycled to the input of the lower chamber 885, although a portion can be stored in a tank 890.

In specific embodiments, formic acid in the tank 890 can be further processed. Periodically, the tank 890 can be emptied by routing concentrated formic acid solution stream 891 to a vacuum column 895. The vacuum column can operate, for example, between 0.4-0.7 bara. In specific embodiments, byproduct electrolyzer heat can be used in the reboiler of the vacuum column 895 or another heat source. Stream 891 can be heated in a heat exchanger to around 95° C. In some embodiments, recycled methyl formate and methanol can be added to the formic acid solution to allow extractive distillation, producing up to a 70 wt % formic acid product from the condensed distillate 897. Bottoms stream 896 can contain dissolved residual ammonium formate and water, which can be recycled back to the EDBM loop along with degassed output 889. Water vapor in the vacuum column can also be condensed separately and added as an additional input feed of SWRO 830, while methyl formate and methanol vapor can be condensed and recycled to the column feed. The vacuum column and solvent can be periodically switched to a sodium formate/sodium thiocyanate purge stream from the trace acid gas removal scrubber 562. This allows recovery through output stream 898 of a 70 wt % formic acid, recovery of ammonia as 5 wt % ammonia water converted to ammonium sulfate, and a 50 wt % sodium thiosulfate solution. If necessary, some of the 70 wt % formic acid can be recycled to the feed for effective distillation, but alternatively, an additional counter flow reverse osmosis system can be used to concentrate feed ammonium formate which would reduce the need for recycling.

Figure 9:
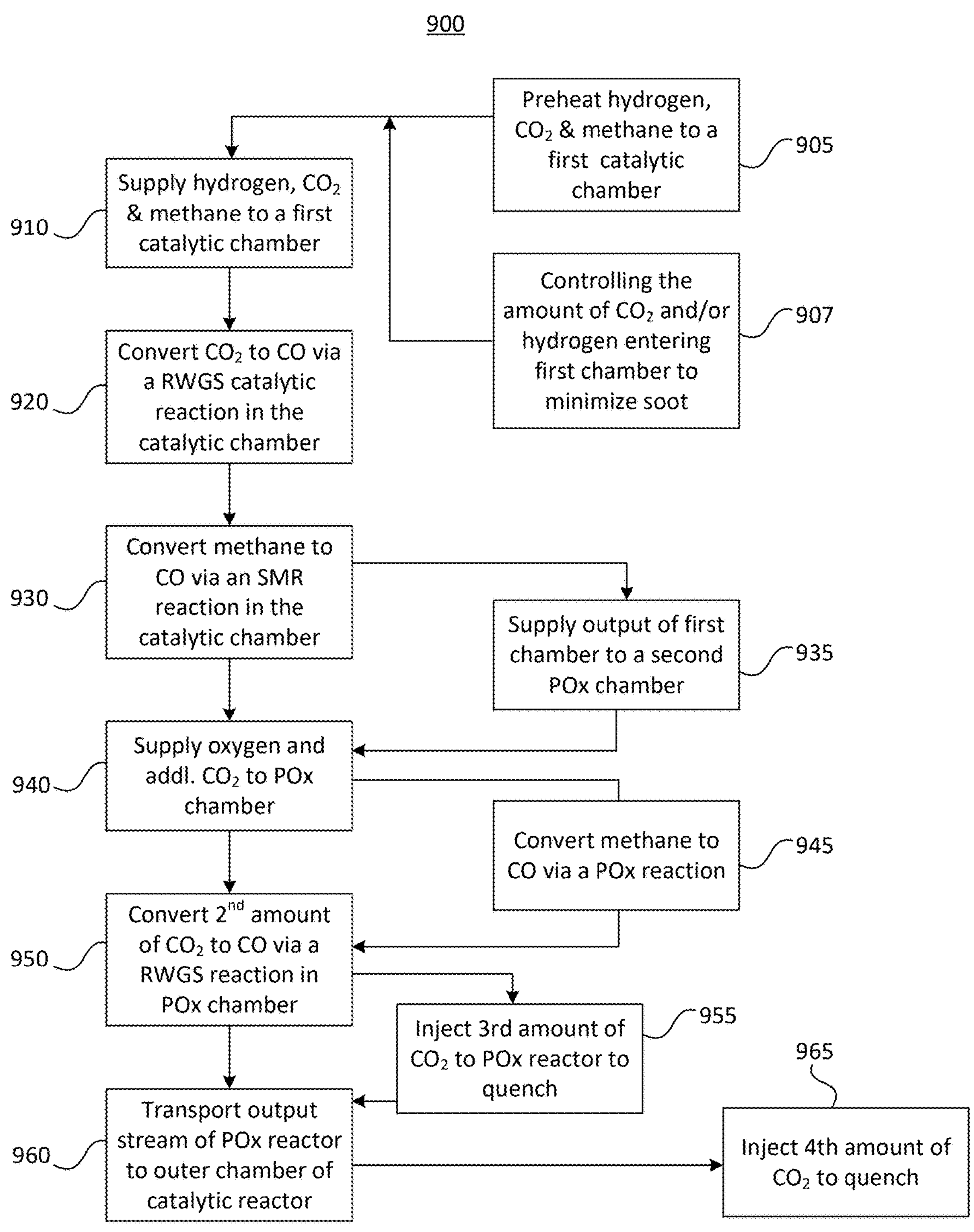
FIG. 9 provides a diagram of a process for conversion of $CO_2$ to CO in accordance with specific embodiments of the inventions disclosed herein.

A diagram showing a process 900 for converting $CO_2$ to CO is shown in FIG. 9 according to specific embodiments of the invention. The process can begin with step 910, where hydrogen, $CO_2$, and methane are supplied to a first chamber in a catalytic reactor. The hydrogen, $CO_2$, and methane may be optionally preheated with heat from the output of the POx reactor first in step 905. Also, the amount of $CO_2$ and/or hydrogen can be controlled at step 907 when supplying them to the first chamber in the catalytic reactor to minimize soot production. In step 920, $CO_2$ is converted to CO via the RWGS reaction using a catalyst in the first chamber. In step 930, methane is converted to CO via the SMR reaction in the first chamber. Note that steps 920 and 930 may occur roughly concurrently. In optional step 935, the output of the first chamber can be routed to the input of a second chamber in a POx reactor. The output of the first chamber can contain CO, hydrogen, and residual methane.

In step 940, oxygen and a second amount of $CO_2$ can be supplied to the second chamber in the POx reactor. In optional step 945, methane can be converted to CO and hydrogen via a partial oxidation reaction. In step 950, a portion of the second amount of $CO_2$ can be converted to CO via the RWGS reaction. In optional step 955, a third amount of $CO_2$ can be added into the POx reactor to quench the reactant gases; a portion of the third amount of $CO_2$ can be converted at this point. In step 960, the output stream of the POx reactor may be transported to the outer chamber of the catalytic reactor. In optional step 965, a fourth amount of $CO_2$ can be added to either the POx reactor or the outer chamber of the catalytic reactor to further quench and cool the POx reactor reactant gases. Additional $CO_2$ may be converted to CO at this step. Step 965 could occur before or after step 960.

Figure 10:
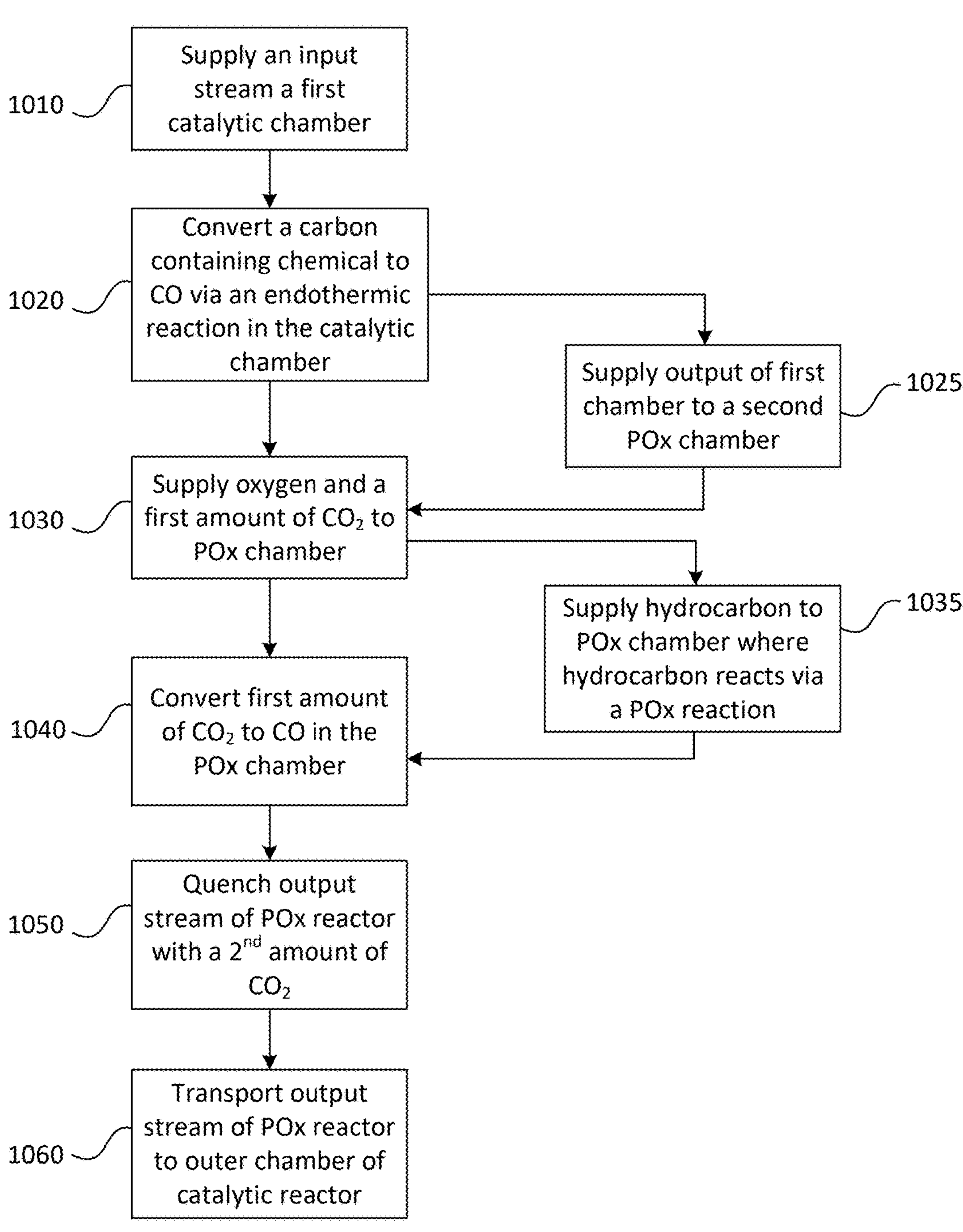
FIG. 10 provides a diagram of a second process for conversion of $CO_2$ to CO in accordance with specific embodiments of the inventions disclosed herein.

A diagram showing a process 1000 for converting $CO_2$ to CO is shown in FIG. 10 according to specific embodiments of the invention. The process can begin with step 1010, where an input stream is supplied to a first chamber in a catalytic reactor. In step 1020, a carbon containing chemical is converted to CO via an endothermic reaction using a catalyst in the first chamber. In optional step 1025, the output of the first chamber can be routed to the input of a second chamber in a POx reactor.

In step 1030, oxygen and a first amount of $CO_2$ can be supplied to the second chamber in the POx reactor. In optional step 1035, a hydrocarbon can be supplied to the POx reactor and reacted via a partial oxidation reaction. In step 1040, a portion of the first amount of $CO_2$ can be converted to CO. In step 1050, a second amount of $CO_2$ can be added into the POx reactor to quench the reactant gases. In step 1060, the output stream of the POx reactor can be transported to an outer chamber in contact with the chamber in the catalytic reactor. Heat transferred to the catalytic chamber can facilitate reactions within the catalytic chamber.

Different systems and methods for conversion of $CO_2$ into CO are described in detail in this disclosure. The methods and systems disclosed in this section are nonlimiting embodiments of the invention, are provided for explanatory purposes only, and should not be used to constrict the full scope of the invention. It is to be understood that the disclosed embodiments may or may not overlap with each other. Thus, part of one embodiment, or specific embodiments thereof, may or may not fall within the ambit of another, or specific embodiments thereof, and vice versa. Different embodiments from different aspects may be combined or practiced separately. Many different combinations and sub-combinations of the representative embodiments shown within the broad framework of this invention, that may be apparent to those skilled in the art but not explicitly shown or described, should not be construed as precluded.

While the specification has been described in detail with respect to specific embodiments of the invention, it will be appreciated that those skilled in the art, upon attaining an understanding of the foregoing, may readily conceive of alterations to, variations of, and equivalents to these embodiments. These and other modifications and variations to the present invention may be practiced by those skilled in the art, without departing from the scope of the present invention, which is more particularly set forth in the appended claims.

What is claimed is:

1. A method comprising:

supplying hydrogen, a first amount of carbon dioxide, and a first amount of methane to an input stream of a first chamber, wherein the first chamber contains a catalyst and is part of a catalytic reactor;

converting the first amount of carbon dioxide into a first amount of carbon monoxide in the first chamber via a reverse water gas shift reaction in the first chamber;

converting at least a portion of the first amount of methane into a second amount of carbon monoxide in the first chamber via a steam reforming reaction;

supplying an output stream of the first chamber as a first input stream of a second chamber, wherein the output stream of the first chamber comprises hydrogen, the first and second amounts of carbon monoxide, and residual methane from the first amount of methane;

supplying oxygen and a second amount of carbon dioxide as a second input stream of the second chamber, wherein the second chamber is part of a partial oxidation reactor;

converting the second amount of carbon dioxide into a third amount of carbon monoxide in the second chamber via a reverse water gas shift reaction in the second chamber;

transporting an output stream of the partial oxidation reactor through an outer chamber of the catalytic reactor to facilitate the reverse water gas shift reaction in the first chamber and the steam reforming reaction in the first chamber; and injecting a third amount of carbon dioxide into a third input stream of the second chamber to quench the output stream of the partial oxidation reactor and reduce a temperature of the output stream of the partial oxidation reactor, wherein a portion of the third amount of carbon dioxide is converted into a fourth amount of carbon monoxide.

2. The method of claim 1, wherein:

the output stream of the partial oxidation reactor is transported through an outer chamber surrounding the first chamber to supply heat for the reverse water gas shift and steam reforming reactions.

3. The method of claim 1, further comprising:

controlling the amount of carbon dioxide entering the input stream of the first chamber to avoid soot production in the first chamber.

4. The method of claim 1, further comprising:

controlling the amount of hydrogen entering the input stream of the first chamber to avoid soot production in the first chamber.

5. The method of claim 1, further comprising:

converting residual methane from the first amount of methane supplied to the second chamber to carbon monoxide and hydrogen via a partial oxidation reaction.

6. The method of claim 1, further comprising:

preheating the hydrogen, the first amount of carbon dioxide, and the first amount of methane supplied to the first chamber using heat recovered from the output stream of the second chamber.

7. The method of claim 1, wherein:

the oxygen supplied to the second chamber is preheated using byproduct heat from a water electrolyzer or an oxocarbon electrolyzer prior to entry into the second chamber.

8. The method of claim 1, wherein the second chamber further comprises one or more quenching sections.

9. The method of claim 1, wherein:

soot formed in the output stream of the partial oxidation reactor is recycled as an input to the second chamber.

10. The method of claim 1, further comprising:

injecting a fourth amount of carbon dioxide into an additional input of the second chamber or the outer chamber to quench the output stream of the partial oxidation reactor and further reduce the temperature of the output stream of the partial oxidation reactor, wherein a portion of the fourth amount of carbon dioxide is converted into a fifth amount of carbon monoxide.

11. The method of claim 10, wherein one or more of the second, third, and fourth amounts of carbon dioxide contain a corrosion-inhibiting compound.

12. The method of claim 11, wherein the corrosion-inhibiting compound is hydrogen sulfide.

13. The method of claim 11, wherein:

the corrosion-inhibiting compound in the output stream of the partial oxidation reactor is recycled as an input to the second chamber.

* * * * *